United States Patent
Imade

(10) Patent No.: US 7,303,284 B2
(45) Date of Patent: Dec. 4, 2007

(54) IMAGE PROJECTING APPARATUS

(75) Inventor: Shinichi Imade, Iruma (JP)

(73) Assignee: Olympus Corporation, Tokyo (JP)

( * ) Notice: Subject to any disclaimer, the term of this patent is extended or adjusted under 35 U.S.C. 154(b) by 235 days.

(21) Appl. No.: 10/948,880

(22) Filed: Sep. 24, 2004

(65) Prior Publication Data
US 2005/0068503 A1  Mar. 31, 2005

(30) Foreign Application Priority Data
Sep. 30, 2003 (JP) ............... 2003-341155

(51) Int. Cl.
G03B 21/00 (2006.01)
G03B 21/26 (2006.01)
H04N 9/73 (2006.01)
H04N 5/74 (2006.01)
G02F 1/1335 (2006.01)
G09G 3/32 (2006.01)
G09G 3/36 (2006.01)
H01L 33/00 (2006.01)

(52) U.S. Cl. ............... 353/31; 353/94; 348/655; 348/750; 348/758; 348/759; 345/63; 345/77; 345/82; 345/88; 345/690; 362/612; 362/555; 362/561

(58) Field of Classification Search ............ 353/31, 353/37, 84, 98, 99, 102, 121, 94; 349/5, 349/7, 8; 348/739, 744, 750, 758, 631, 655, 348/759; 345/1.1, 88, 20, 22, 690, 102, 63, 345/77, 82; 362/612, 555, 561, 551
See application file for complete search history.

(56) References Cited

U.S. PATENT DOCUMENTS 6,043,797 A * 3/2000 Clifton et al. ............... 345/589
6,129,437 A   10/2000 Koga et al. .................. 353/98
2002/0000960 A1 * 1/2002 Yoshihara et al. .......... 345/87

FOREIGN PATENT DOCUMENTS

| JP | 2002-51353  | 2/2002 |
| JP | 2002-82652  | 3/2002 |
| JP | 11-32278    | 4/2002 |
| JP | 2002-112962 | 4/2002 |

* cited by examiner

Primary Examiner—Rochelle Blackman
(74) Attorney, Agent, or Firm—Volpe & Koenig PC

(57) ABSTRACT

An image projecting apparatus projects an image formed on a display device in accordance with input image data, onto a projection surface with illumination light emitted from a light source, to enable an observer to observe the image. The image projecting apparatus comprises a distribution area recognizing section configured to recognize an area in which the input image data is distributed in a color space, and a projection condition controlling section configured to convert the input image data to increase brightness of the image to be projected onto the projection surface without changing a color balance of the image, based on the area recognized by the distribution area recognizing section, and send image data obtained by conversion of the input image data to the display device, and also control brightness of illumination light emitted from the light source in connection with the conversion of the input image data.

33 Claims, 13 Drawing Sheets

|  | GRADATION DATA COVERSION | LIGHT AMOUNT COTROL | UPPER LIMIT OF LIGHT AMOUNT OF DISPLAYED IMAGE |
|---|---|---|---|
| IMAGE X | TWICE | $x_2/x_0$ = TWICE | 2 × 2 TIMES |
| IMAGE Y | EIGHT TIMES | $y_2/y_0$ = 1/2 TIMES | 8 × (1/2) TIMES |
FIG. 6
|  | LIGHT AMOUNT COTROL | GRADATION DATA COVERSION | UPPER LIMIT OF LIGHT AMOUNT OF DISPLAYED IMAGE |
|---|---|---|---|
| IMAGE X | $X_{max}/x_0$ TIMES = 2 | TWICE | 2 × 2 TIMES |
| IMAGE Y | $Y_{max}/y_0$ TIMES = 1 | FOUR TIMES | 1 × 4 TIMES |
FIG. 9
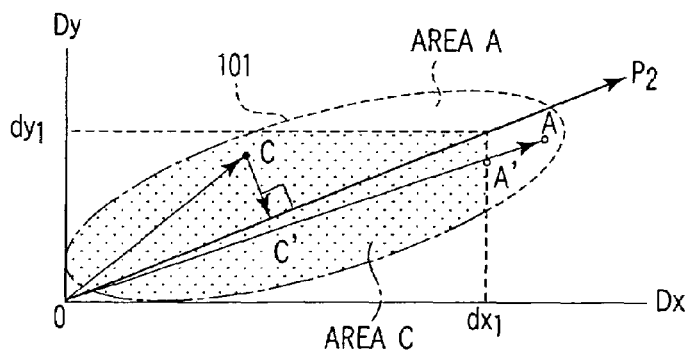
FIG. 10
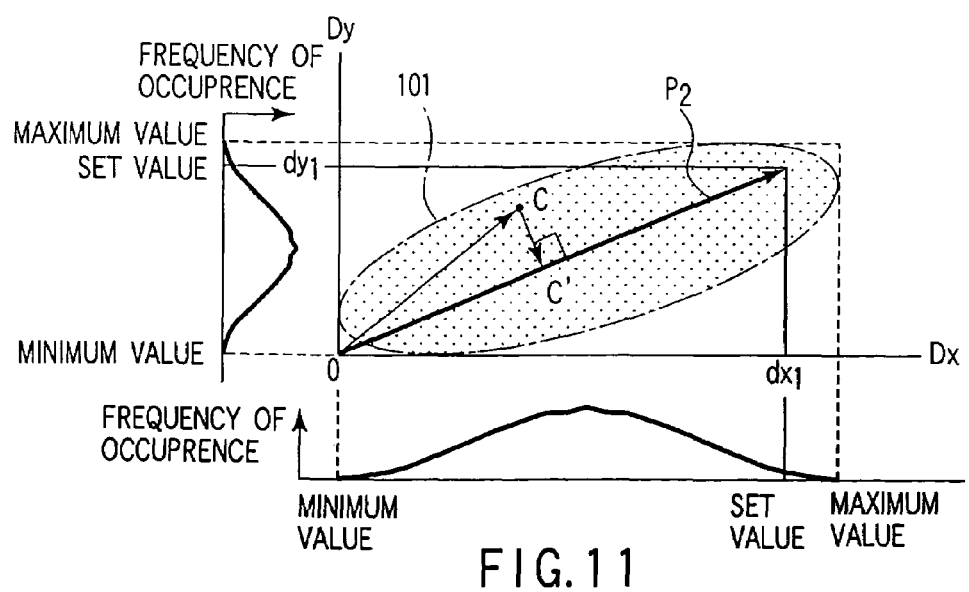
FIG. 11

IMAGE PROJECTING APPARATUS

CROSS-REFERENCE TO RELATED APPLICATIONS

This application is based upon and claims the benefit of priority from prior Japanese Patent Application No. 2003-341155, filed Sep. 30, 2003, the entire contents of which are incorporated herein by reference.

BACKGROUND OF THE INVENTION

1. Field of the Invention

The present invention relates to an image display apparatus for displaying an image, and in particular an image projecting apparatus for projecting an image formed on a display device onto a projection surface with an illumination light from a light source in accordance with input image data, such that the image can be observed by an observer.

2. Description of the Related Art

As an image display apparatus for displaying an image, an apparatus is provided which uses a display device such as a liquid crystal or a micro mirror to control the transmission amount or reflection amount of an illumination light from an illumination device, modulate the illumination light, and form and display a gray-scale image. A liquid crystal monitor, a projector and the like are provided as the above apparatus. To display a color image, as is often the case, illumination light components of primary colors are separately modulated, and are spatially combined or are combined while being emitted at different timings, thereby forming a color image. When a color image is displayed, it is necessary to adjust the combination ratio of the light components of primary colors with respect to balance, in order to ensure a high color reproducibility. Thus, generally, when input image data items regarding the primary colors are the same as each other, a so-called "white balance" is fixedly adjusted such that the combination of the colors looks white.

In general, illumination light components of primary colors are generated by fixedly separating light components of primary colors from light emitted from a white-light lamp by using a color separation optical element such as a dichroic mirror or a color filter. Thus, the illumination amount of the light components of primary colors cannot be flexibly controlled. Therefore, at an initial stage, the balance of the light components of primary colors is optically set to satisfy a predetermined ratio, thereby adjusting the white balance. Alternatively, the amount of modulation by the display device based on the input image data is corrected according to a predetermined conversion rule, thereby adjusting the white balance.

On the other hand, the upper limit of the brightness of illumination light or that of a displayed image obtained due to modulation by a display device can be more reliably set to the maximum, when the image is formed with illumination light components of primary colors the outputs of which are each set at the maximum. However, in general, there are no light sources which emit illumination light components of primary colors such that their maximum outputs are "white-balanced" by chance. Thus, in the above case, the white balance is lost as explained above, and inevitably the color reproducibility lowers. That is, in order to ensure that the brightness of the illumination light is the maximum, a high color reproducibility cannot be ensured, and in order to obtain a high color reproducibility, the light source cannot be made to emit the maximum amount of illumination light.

As a method for solving such a problem, a method disclosed in, e.g., Jpn. Pat. Appln. KOKAI Publication No. 2002-51353 is known. According to the method, only when the gradation levels indicated by image data items regarding primary colors which are included in the input image data are all the maximum or the minimum, an image is displayed by illumination light components of primary colors the outputs of which are the maximum. In the other cases, it is displayed in such a way as to maintain a predetermined white balance. Therefore, when the above gradation levels are all the maximum or minimum, the brightness of the displayed image is the maximum or minimum, but the color balance of the image is lost. Thus, generally, such a state is not recognized as a state in which a white balance is maintained. However, the brightness of the image can be increased without relatively worsening the color balance.

Furthermore, Jpn. Pat. Appln. KOKAI Publication No. 2002-82652 discloses a so-called plane sequential type of image display apparatus, and an embodiment of the apparatus in which white illumination is performed each time light of each of primary colors is emitted. In the plane sequential of image display apparatus, illumination light components of primary colors are successively emitted onto a display device, and they are combined into an image to be displayed, while being viewed with observer's eyes. The method disclosed in the Publication is intended to improve the brightness of a produced image by emphasizing a white image component corresponding to a white image data item included in input image data. In a number of conventional plane sequential system of image display apparatuses, no image is displayed at the time of effecting switching between illumination light components of primary colors and between modulated images at a display device which correspond to the illumination light components, in order to prevent lowering of the quality of a displayed image, which would occur due to mixing of the color components at the time of effecting the above switching. However, the time for which illumination light is applied is shortened by the time for which no image is displayed, thus lowering the brightness of the displayed image. The technique of Jpn. Pat. Appln. KOKAI Publication No. 2002-82652 is intended to solve such a problem. However, in the technique of the Publication, the time period for which each of light components of primary colors is applied and that for which white illumination is performed are fixedly set at predetermined time periods.

The apparatus which is of such a plane sequential type as described above is not limited to an image display apparatus. To be more specific, there are provided plane sequential type of apparatuses which adjust and set the balance of the amounts of illumination light components of primary colors in accordance with various purposes. For example, in such a plane sequential type of electron endoscope as disclosed in Jpn. Pat. Appln. KOKAI Publication No. 2002-112962, the balance of illumination light components of primary colors is adjusted and set to correct the unbalance of the spectral sensitivity of an image pickup sensor.

The techniques disclosed in the above Publications are intended to increase the upper limit of the brightness of an image displayed by an image display apparatus, without excessively worsening the color balance of the image, and to obtain an image with a high reproducibility by adjusting the color balance of illumination light, thus adjusting the characteristics of an image pickup system.

BRIEF SUMMARY OF THE INVENTION

According to an aspect of the present invention, there is provided an image projecting apparatus for projecting an image formed on a display device in accordance with input image data, onto a projection surface with illumination light emitted from a light source, to enable an observer to observe the image, the image projecting apparatus comprising:

a distribution area recognizing section configured to recognize an area in which the input image data is distributed in a color space; and a projection condition controlling section configured to convert the input image data to increase brightness of the image to be projected onto the projection surface without changing a color balance of the image, based on the area recognized by the distribution area recognizing section, and send image data obtained by conversion of the input image data to the display device, and also control brightness of illumination light emitted from the light source in connection with the conversion of the input image data.

According to an another aspect of the present invention, there is provided an image projecting apparatus for projecting an image formed on a display device in accordance with input image data, onto a projection surface with illumination light emitted from a light source, to enable an observer to observe the image, the image projecting apparatus comprising:

distribution area recognizing means for recognizing an area in which the input image data is distributed in a color space; and projection condition controlling means for converting the input image data to increase brightness of the image to be projected onto the projection surface without changing a color balance of the image, based on the area recognized by the distribution area recognizing means, and sending image data obtained by conversion of the input image data to the display device, and also controlling brightness of illumination light emitted from the light source in connection with the conversion of the input image data.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 6 is a view which shows values set with respect to the projection condition and the upper limits of amounts of displayed images which can be achieved at the set values.

FIG. 9 is a view which shows values set with respect to the projection condition and the upper limits of amounts of displayed images which can be achieved at the set values.

FIG. 10 is a view for use in explaining a method for calculating an appropriate color balance vector in an image projecting apparatus according to the third embodiment of the present invention.

FIG. 11 is a view for use in explaining a method for calculating an appropriate color balance vector in an image projecting apparatus according to the fourth embodiment of the present invention.

DETAILED DESCRIPTION OF THE INVENTION

The embodiments of the present invention will be explained with reference to the accompanying drawings.

The First Embodiment

Figure 1:
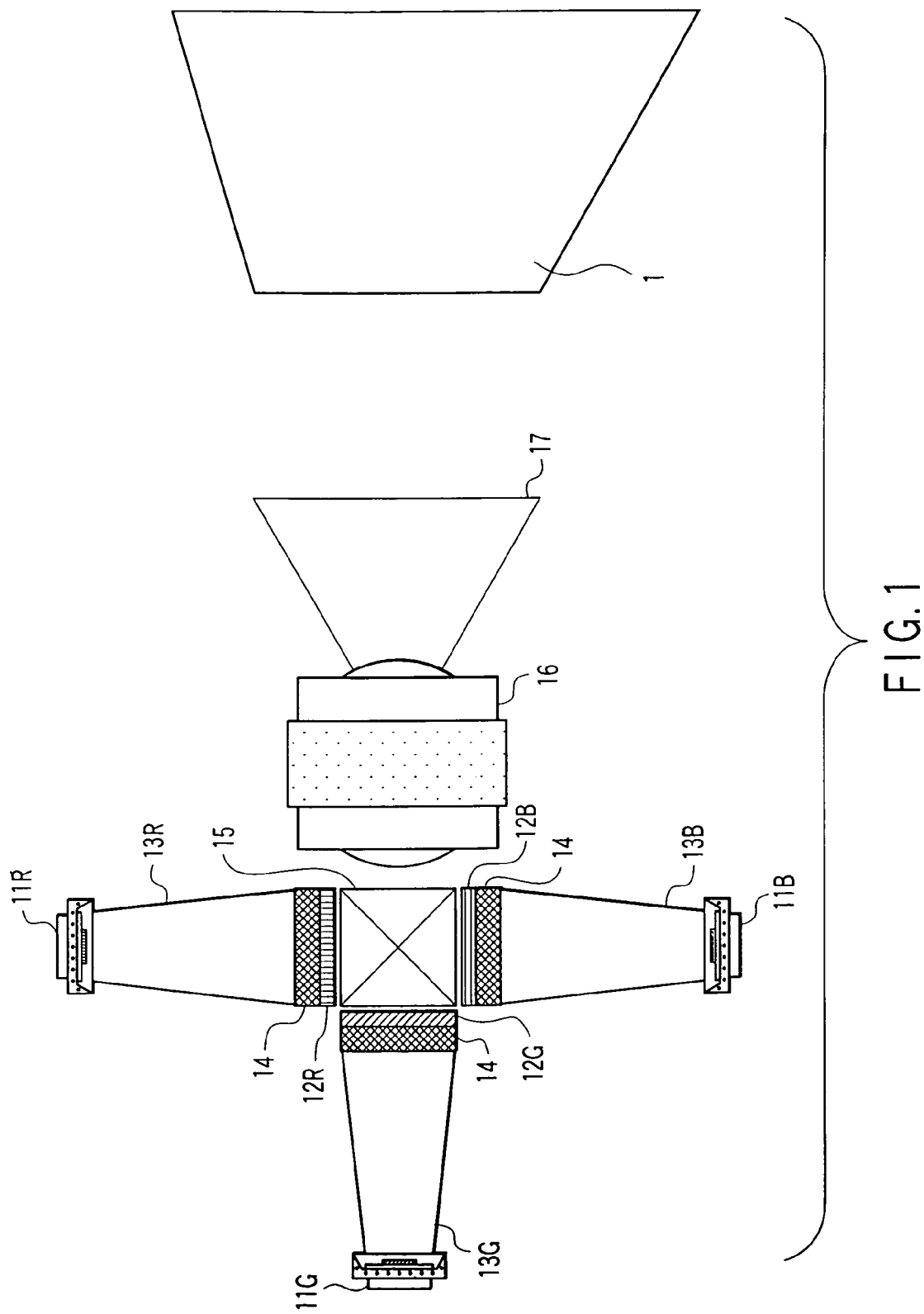
FIG. 1 is a view showing an optical structure of an image projecting apparatus according to the first embodiment of the present invention.

As shown in FIG. 1, an image projecting apparatus according to the first embodiment is provided to project an image formed on a display device onto a projection surface (screen 1) with an illumination light from a light source in accordance with input image data, such that the image can be observed by an observer. The image projecting apparatus uses as the light source a number of LEDs which emit respective light components having different colors, i.e., an LED 11R for emitting a red (R) light component, an LED 11G for emitting a green (G) light component and an LED 11B for emitting a blue (B) light component. Also, as the display device, a number of display devices (an R display device 12R, a G display device 12G, and a B display device 12B) are respectively provided for the colors of the image projected onto the screen 1. To be more specific, the display devices 12R, 12G and 12B form images at the same time in accordance with information regarding respective colors, which is included in input image data, and the light components from the LEDs 11R, 11G and 11B are respectively emitted onto the display devices 12R, 12G and 12B at the same time. That is, light components emitted from the LEDs 11R, 11G and 11B at all times are respectively guided by taper rods 13R, 13G and 13B to the display devices 12R, 12G and 12B through polarization light converting elements 14. Each of the taper rods 13R, 13G and 13B is formed such that its light-emitting end is larger in area than its light-incident end, and converts diffused light from an associated LED to decrease the NA of the light. That is, each taper rod transforms the diffused light from the associated LED into substantially parallel light. Furthermore, in the first embodiment, light transmission type LCDs (liquid crystal panels) are used as the display devices 12R, 12G and 12B. Thus, the polarization light converting elements 14 are located in front of the display devices 12R, 12G and 12B in order to permit only light components having a predetermined polarizing angle to pass through the polarization light converting elements 14. The light components are optically modulated in accordance with the images displayed on the display devices 12R, 12G and 12B, and are combined into light by a dichroic cross prism 15. The light is projected as a projection light 17 onto the screen 1 by a projection lens 16. It should be noted that although illustrations of polarizing plates will be omitted in the drawings, they are provided at output sides (light emitting sides) of the display devices 12R, 12G and 12B.

Figure 2:
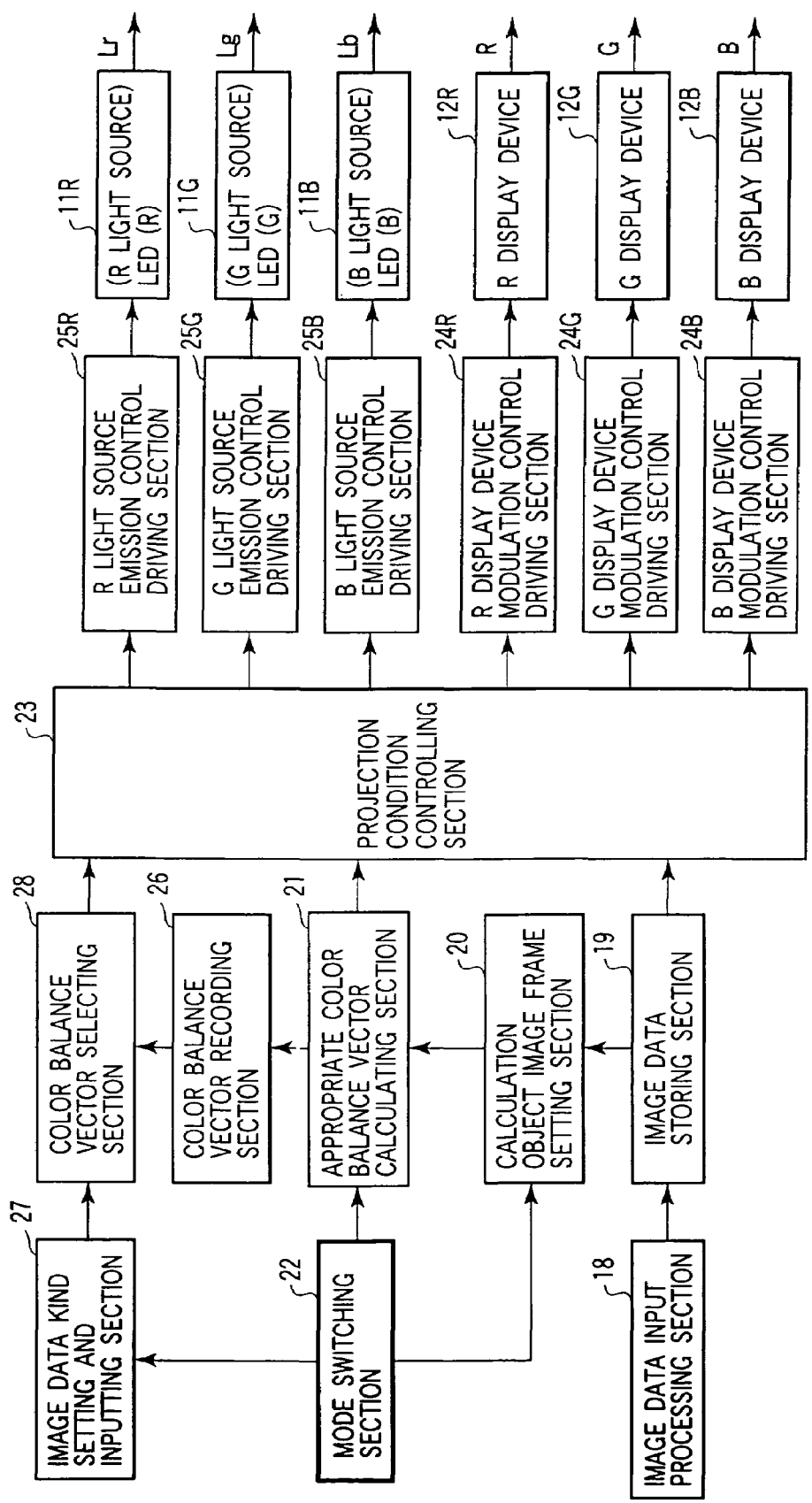
FIG. 2 is a view showing an electrical structure of the image projecting apparatus according to the first embodiment.

The amounts of the light components emitted from the LEDs 11R, 11G and 11B and the data items on the images displayed by the display devices 12R, 12G and 12B are set in accordance with the input image data as follows:

As shown in FIG. 2, image data output from an image outputting device not shown such as a personal computer or a video device is acquired by an image data input processing section 18. The acquired data is once stored in an image data storing section 19.

The image data stored in the image data storing section 19 is read out by a calculation object image frame setting section 20, and the range of image data to be determined as one calculation object image unit is set, the image data being used to determine color distribution of pixels which is used at an appropriate color balance vector calculating section 21 which is located at a stage next to the image data storing section 19.

For example, suppose an image to be displayed based on the input image data is a still image for presentation. To the background of the still image, as is often the case, only one color is applied. Therefore, one report material comprising a number of image frames is determined as one calculation object image unit. If the image to be displayed based on the input image data is a still image of a nature scene, and it is not colored with one color only, it is effective that one frame is determined as one calculation object image unit.

On the other hand, when a moving image is input as the input data, a series of image frames in the moving image, e.g., image frames constituting one scene, are determined as one calculation object image unit. In the case of handling compressed data such as an MPEG in which data compression processing is carried out with respect to each of frames which are successive on a time series basis, it can be considered as a method that the timing of effecting switching between scenes each comprising image frames (which will be hereinafter referred to as scene change) is specified by the position of a frame wherein the amount of compressed data is greatly large, as compared with the other frames. Also, as another method, it can be considered that the value of a correlation between the frames is continuously detected, and a rapid variation of the color or brightness is detected, to thereby specify the timing of the above scene change. In addition, if moving image data is generated in a format in which information regarding the above scene change is added, it is convenient, since the information can be easily utilized.

How the size of one calculation object image unit is determined may be arbitrarily designated by an operator with a mode switching section 22.

The appropriate color balance vector calculating section 21 calculates an appropriate color balance vector from image data of a calculation object image frame or a calculation object unit of image frames set by the calculation object frame setting section 20, in a manner described later, and recognizes an area in which the image corresponding to the input image data is distributed in color space.

The appropriate color balance vector calculated by the appropriate color balance vector calculating section 21 is input to a projection condition controlling section 23. The projection condition controlling section 23 sets the amounts of illumination light components for primary color images, and performs gradation data conversion, on the basis of the input appropriate color balance vector and image data (data comprising image data items regarding primary colors) which is output from the image data storing section 19 as an image to be projected. In this case, the above setting of the amounts of the light components and the gradation data conversion are carried out in such a way as to increase the brightness of an image projected onto the screen 1 without changing the color balance of the image. That is, the input image data is subjected to gradation data conversion as described later in detail, and then obtained image data items regarding primary colors R (red), G (green) and B (blue) are sent to R, G and B display device modulation control driving sections 24R, 24G and 24B, and are displayed by the R, G and B display devices 12R, 12G and 12B, respectively. Signals or data items indicating the amounts of the light components of the primary colors R, G and B which are determined in association with the above gradation data conversion are sent to light source emission control driving sections 25R, 25G and 25B for driving R, G and B light sources, and the LEDs 11R, 11G and 11B, which serve as the R, G and B light sources for emitting the light components of the primary colors R, G and B, are made to emit the light components of the primary colors R, G and B, the amounts of which are indicated by the above signals or data items. The amounts of the light components of the primary colors R, G and B can be controlled by setting at least one of the values of current and values of voltages applied to the LEDs 11R, 11G and 11B, respectively.

The appropriate color balance vector calculated by the appropriate color balance vector calculating section 21 may be recorded in a color balance vector recording section 26. Then, when similar image data is input, processing for calculating an appropriate color balance vector can be omitted by using the appropriate color balance vector recorded in the color balance vector recording section 26. Furthermore, in the color balance vector recording section 26, appropriate color balance vectors may be recorded in advance for the kinds of conceivable image data items, respectively. For example, an image for medical treatment which is obtained by imaging an inner part of a living body or an image of a colored sample which is obtained by a microscope includes a number of specific color components. Therefore, for such an image, it is reasonable that appropriate color balance vectors are determined in advance, and are stored in the color balance vector recording section 26, and any of them can be selected and utilized as a set value. In order to achieve these processings, the image projecting apparatus according to the first embodiment comprises an image data kind setting and inputting section 27 and a color balance vector selecting section 28. The image data kind setting and inputting section 27 enables a user to designate and input desired data kind. The color balance vector selecting section 28 is designed to select a color balance vector from those recorded in the color balance vector recording section 26 in accordance with an image kind ID input from the image data kind setting and inputting section 27.

Furthermore, the mode switching section 22 is provided to enable the user to arbitrarily switch the display mode from a display mode for a calculating an appropriate color balance vector to a display mode using an appropriate color balance vector which is recorded in the color balance vector recording section 26, or vice versa. In addition, the mode switching section 22 may be formed to have a function of effecting switching between a display mode wherein the light amount is set and the gradation data conversion is performed based on the above appropriate color balance vector and a display mode wherein neither the above setting of the light amount nor the above gradation data conversion is performed.

Figure 3:
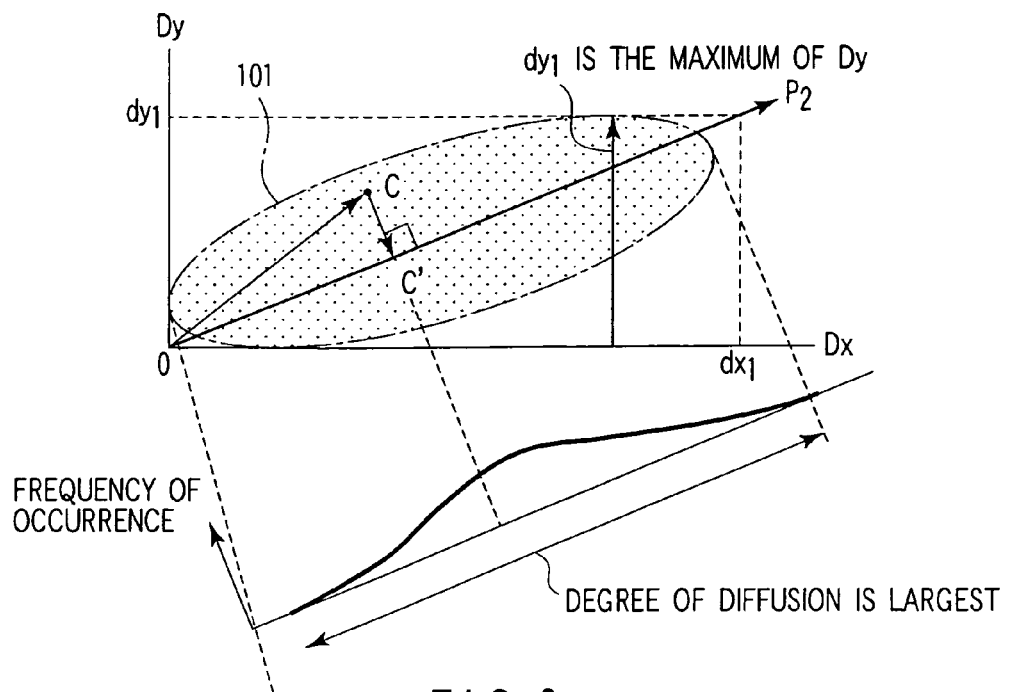
FIG. 3 is a view for use in explaining a method for calculating an appropriate color balance vector.

The above appropriate color balance vector calculating section 21 determines the above appropriate valance vector in a manner shown in, e.g., FIG. 3. It should be noted that suppose images of primary colors are formed in a two-dimensional color space by two illumination light components, i.e., X and Y illumination light components, in order to simplify an explanation of this technique.

As shown in upper part of FIG. 3, a color distribution 101 of image data is obtained, when the color vector of each of pixels in image data regarding an object calculation object image frame is plotted, where a horizontal axis indicates a data value Dx of a primary color X, and a vertical axis indicates a data value Dy of a primary color Y. In the color distribution 101, where $dy_1$ is the maximum value of the primary color Y, an appropriate color balance vector $P_2$ is determined in accordance with the maximum value $dy_1$ and a value $dx_1$ of the primary color X. When the color vector of each of the pixels in the image data regarding the calculation object image frame is projected onto the appropriate color balance vector $P_2$ (for example C→C'), distribution of the frequency of occurrence of color vectors is obtained as shown in lower part of FIG. 3. This processing is successively subjected, while changing the inclination of the appropriate color balance vector $P_2$, i.e., while successively changing the value $dx_1$ of the primary color X. Suppose an appropriate color balance vector $P_2$ in which dispersion of projection distribution is the maximum is a target appropriate color balance vector. Also, it should be noted that the vector in which the dispersion is the maximum is determined by using a neural network and KL conversion generally applied to image processing and coding processing.

Figure 4:
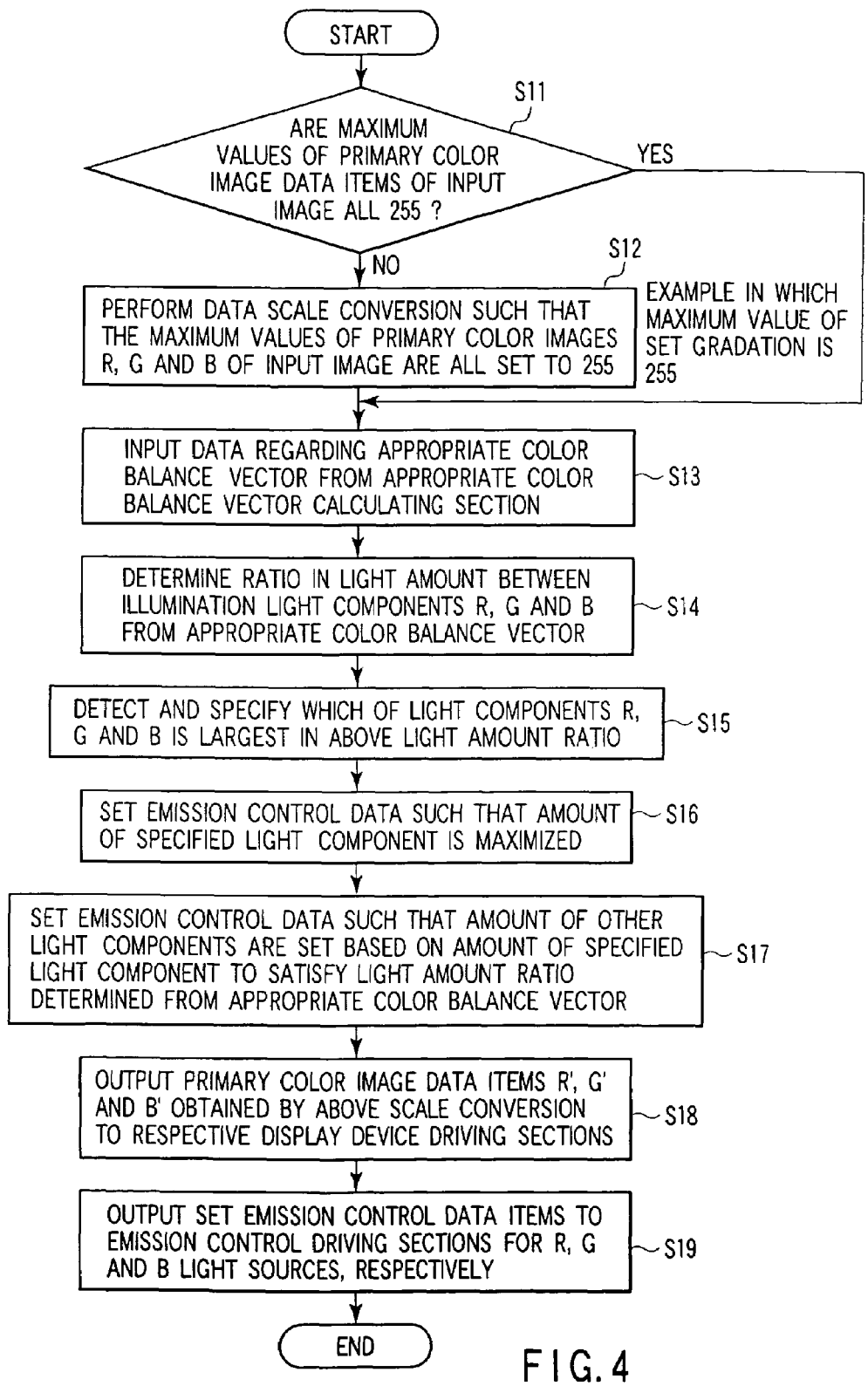
FIG. 4 is a view for use in explaining an operation for setting a projection condition of a projection condition controlling section.

The projection condition controlling section 23 sets a projection condition as shown in FIG. 4. To be more specific, first, it is checked whether the maximum values of primary color image data items on an input image are all 255 or not (step S11). This is true of the case where each of primary colors in each pixel is expressed by 8 bits. Needless to say, if each primary color in each pixel is expressed by another number of bits, the maximum values of the primary color image data items are not 255, i.e., they are determined in accordance with the number of bits. In the above case (i.e., the case where each color in each pixel is expressed by 8 bits), when the maximum values of the primary color image data items are all 255, the gradation data conversion cannot be performed, and thus the step to be carried out proceeds to step S13 described later. On the other hand, when the maximum value of each of the primary color image data items is not 255, data scale conversion is performed such that the maximum values of the primary color image data items are all set to 255, i.e., the maximum values of primary color images R, G and B of an input image are all set to 255 (step S12).

Figure 5:
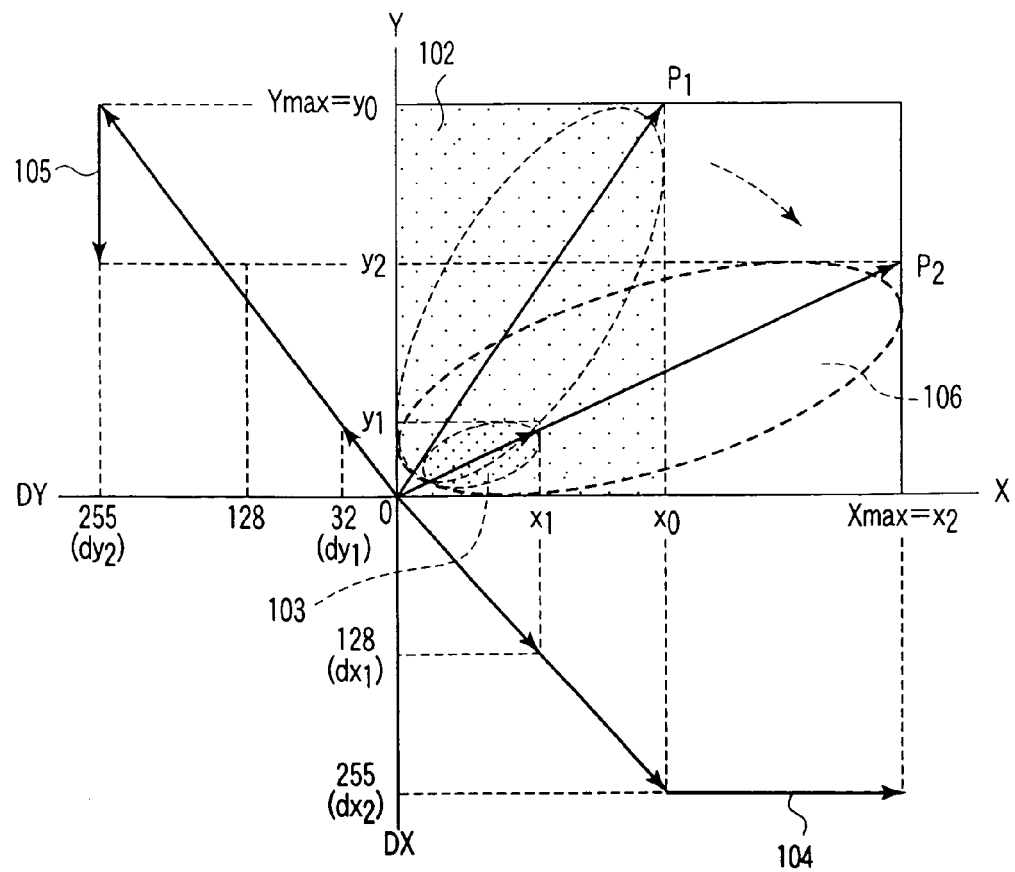
FIG. 5 is a view for use in explaining a color balance method suitable for an image, in which data is maximized, and balancing is achieved with illumination light.

The above scale conversion will be explained with reference to FIG. 5 showing this technique by referring to a two-dimensional color space which is shown to simplify an explanation of the technique. In FIG. 5, X and Y indicate the amounts (brightness) of light components at pixels which are obtained by optically modulating primary color light components corresponding to primary color images X and Y, respectively. In the following explanation, the amounts (brightness) of the light components will be handled as the amounts of light components onto which spectral luminous efficiency characteristics are reflected. Furthermore, Dx and Dy denote image data on the primary color image X and that on the primary color image Y, i.e., they are pixel gradation data on the primary color images X and Y, respectively.

In general, when the primary color Y is color which is greater than the other primary colors in spectral luminous efficiency of light, the white balance is set such that the maximum value $X_0$ of the primary color image X is determined based on the maximum value Ymax of the primary color image Y to satisfy a predetermined ratio between the amounts of light components of primary colors X and Y, where $X_0$ and Ymax denote components of the white balance vector $P_1$ in FIG. 5. Thus, an image can be displayed in a color distribution area 102 in the case where illumination light is white-balanced at ($X_0$, Ymax) in FIG. 5. In this case, of a projection condition, a projection condition of illumination light components of the primary colors X and Y is required to satisfy that their light amounts of displayed images are $X_0$, $Y_0$ (=Ymax), respectively.

In the color distribution area 102, the projection condition is re-set by a projection condition controlling section 23 with respect to image data having a color light amount distribution 103 not yet subjected to a projection condition control. If the maximum levels of image data items on the primary color images X and Y are 128 and 32, respectively, the amounts of light components of displayed images are $x_1$ and $y_1$, respectively. Therefore, first, the scale conversion is carried out in a linear fashion such that the maximum gradation level of the image X is changed from 128 to 255. As a result, the light amount $x_0$ of the displayed image is increased to be double the original light amount $x_1$ thereof. Similarly, the scale conversion is performed in a linear fashion such that the maximum gradation level of the image Y is changed from 32 to 255. As a result, the light amount $y_0$ of the displayed image is increased to be eight times greater than the original light amount $y_1$ thereof.

Next, data on the appropriate color balance vector $P_2$ is input from the appropriate color balance vector calculating section 21 (step S13), and the ratio in light amount between the illumination light components R, G and B is determined from the appropriate color balance vector (step S14). Then, which of the light components R, G and B is the largest in the above ratio is detected and specified (step S15), and an associated emission control data item is set such that the amount of the specified light component is maximized (step S16). Also, the other emission control data items are set such that the amounts of the other light components are set based on the amount of the specified light component to satisfy the ratio in light amount which is determined from the appropriate color balance vector (step S17).

For example, in the example shown in FIG. 5, as indicated as an increased amount 104 of an X illumination light component, the amount of the illumination light component of the primary color X is controlled such that it is increased from $X_0$ to $X_2$ (=Xmax), and as indicated as a decreased amount 105 of a Y illumination light component, the amount of the illumination light component of the primary color Y is controlled such that it is decreased from $y_0$ to $y_2$. In the example, $X_2$ indicates the maximum amount of the illumination light component of the primary color X, and $X_2$ and $Y_2$ are components of the appropriate color balance vector $P_2$.

Then, primary color image data items R', G' and B' obtained by the above scale conversion are output to display device driving sections 24R, 24G and 24B, and the display devices 12R, 12G and 12B are driven thereby (step S18). Also, the set emission control data items are output to the light source emission control driving sections 25R, 25G and 25B for the R, G and B light sources, and the LEDs 11R, 11G and 11B serving as the R, G and B light sources are made thereby to emit light components, respectively (step S19). Consequently, in the example shown in FIG. 5, the color light amount distribution 103 of the displayed image which is not yet subjected to the control is changed to the color light amount distribution 106 of the displayed image which is subjected to the control. In such a manner, a displayable range of the color distribution of the image data, in which an image can be displayed with a sufficiently necessary color distribution, is specified, and a projection condition (light amount and gradation data conversion) is adjustedly set such that an image can be more brightly displayed, while maintaining the specified displayable range of the color distribution.

That is, in the example shown in FIG. 5, as shown in FIG. 6, the value of the data on the primary color image X is doubled by gradation data conversion, and the light amount of the primary color image X is increased by $X_2/X_0$ times, i.e., it is doubled, as a result of which the upper limit of the light amount of the displayed image is increased by 2×2=4 times. The value of the data on the primary color image Y is increased by eight times by gradation data conversion, and the light amount of the primary color image Y is controlled to be decreased by $x_2/x_0$ times, i.e., it is halved, as a result of which the upper limit of the light amount of the displayed image is also increased by 8 (½)=4 times.

That is, the projection condition controlling section 23 determines the data ratio between data values of the maximum gradation levels of the colors of the images displayed by the display devices 12R, 12G and 12B to input image data items, and sets the amounts of illumination light components from the LEDs 11R, 11G and 11B serving as the light sources by using a reciprocal ratio of the above data ratio. Further, the projecting condition controlling section 23 changes the input image data values to the above data values of the maximum gradation levels. For example, suppose the data values of the maximum gradation levels of the colors R, G and B are 256, 256 and 256, and the input image data values of the colors R, G and B are 64, 32 and 128. In this case, the ratio between the data values of the colors R, G and B is 4:8:2, and the reciprocal ratio thereof is ¼:⅛:½=2:1:4. Therefore, the amounts of illumination light components to be emitted from R, G and B light sources (the LEDs 11R, 11G and 11B) are set to be increased by 2m times, m times, and 4m times, and the input image data values of the colors R, G and B are changed to 256, 256 and 256 (where m is adjusted such that the amounts of light components from the R, G and B light sources are within the maximum emission light amount.

The Second Embodiment

Figure 7:
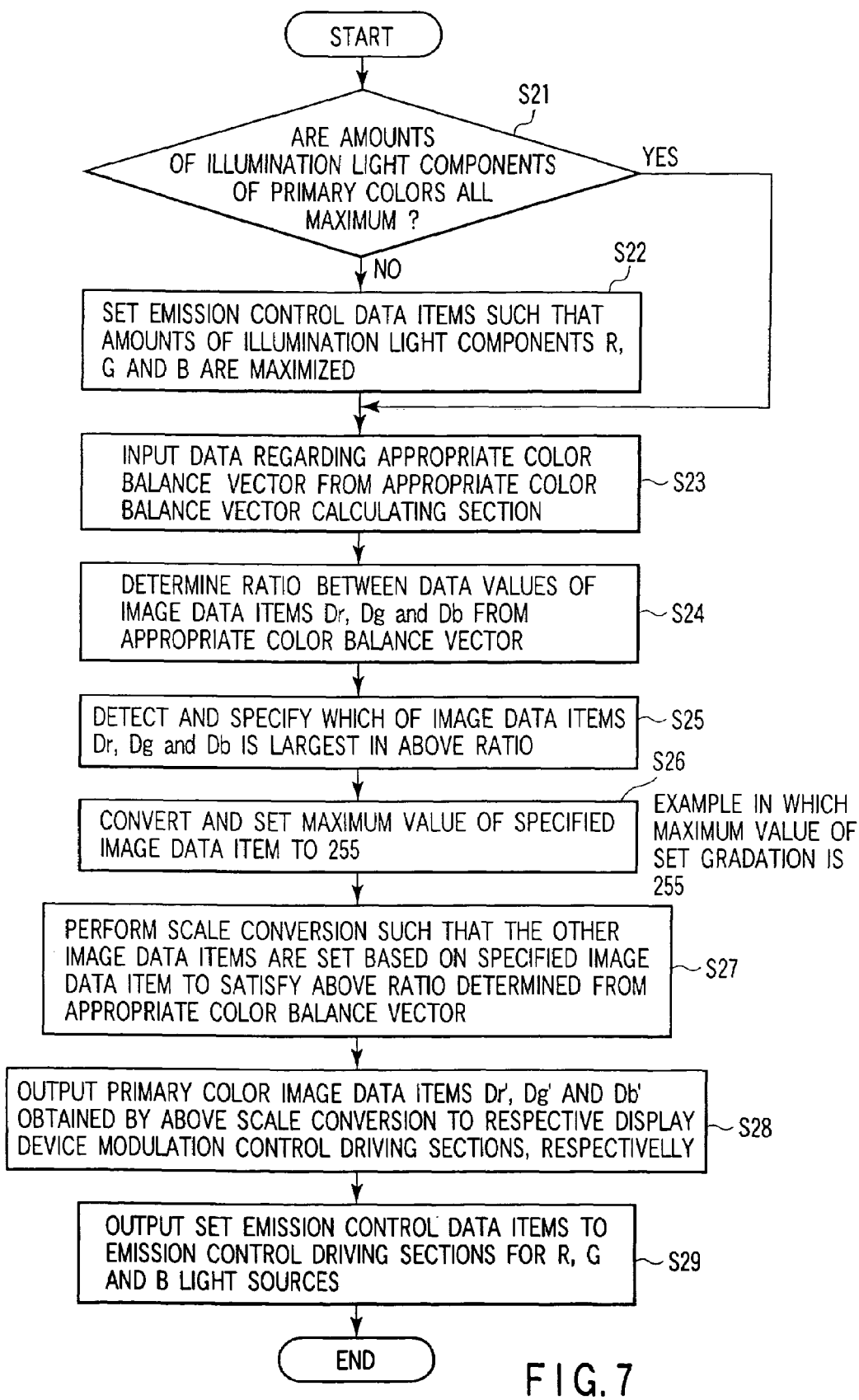
FIG. 7 is a flow chart for use in explaining an operation for setting the projection condition in a projection condition controlling section of the image projecting apparatus according to the first embodiment.

The second embodiment of the present invention has the same structure as the first embodiment; however, it is another example of setting of a projection condition by the projection condition controlling section 23. To be more specific, in the second embodiment, the projection condition controlling section 23, as shown in FIG. 7, first, detects whether the amounts of the illumination light components of primary colors are all the maximum (step S21). In this case, when the amounts of the illumination light components are all the maximums, adjustment of the amounts cannot be carried out any more. Thus, the step proceeds to step S23 which will be described later. On the other hand, when the above amounts are not the maximums, emission control data items are set such that the amount of the illumination light component R is maximized, that of the illumination light component G is maximized, and that of the illumination light component is maximized (step S22).

Figure 8:
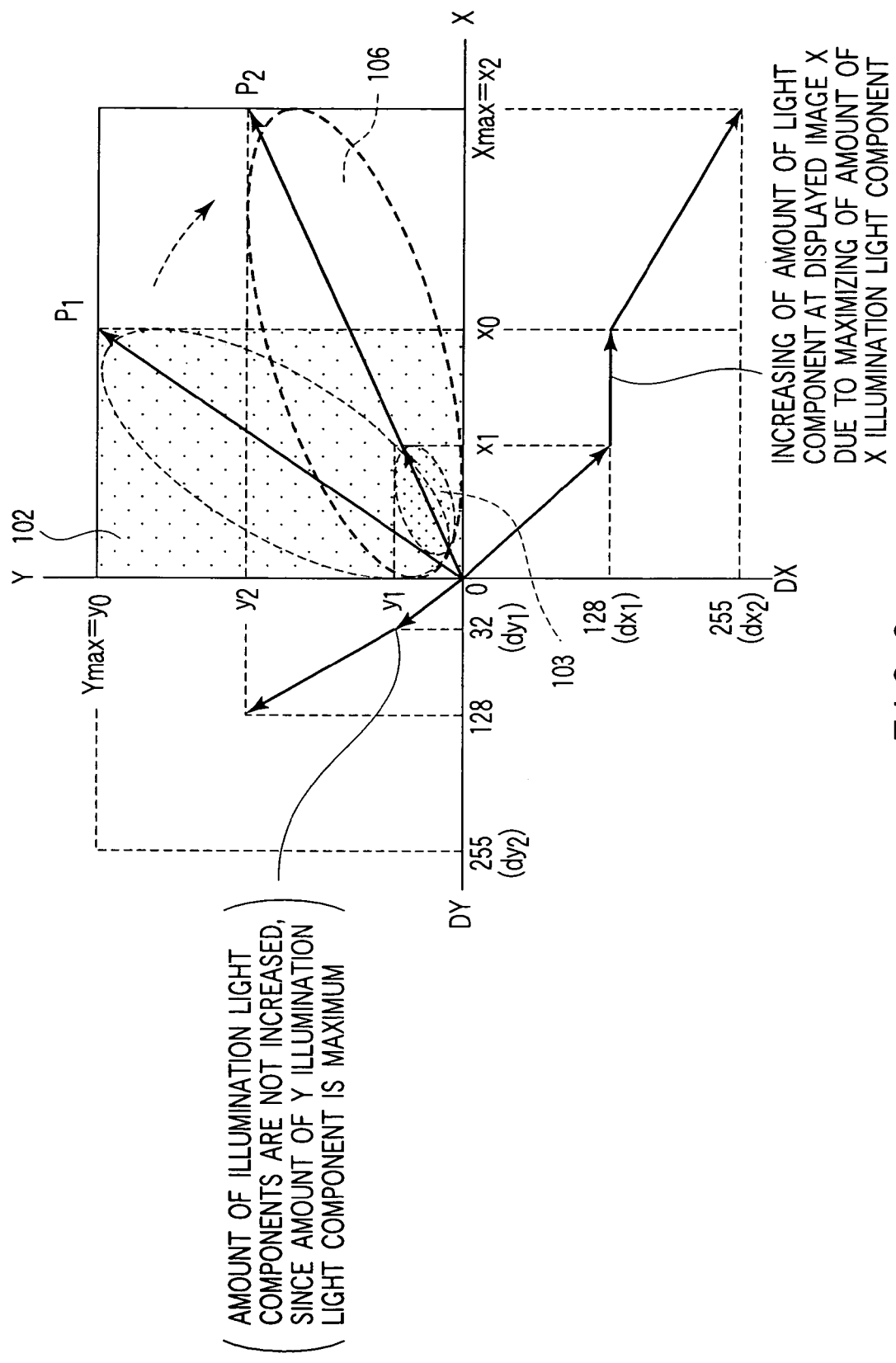
FIG. 8 is a view for use in explaining a color balance method suitable for an image, in which data is maximized, and balancing is achieved with data.

The above technique will be explained with reference to FIG. 8 showing the technique by referring to a two-dimensional color space which is shown to simplify an explanation of the technique. The condition shown in FIG. 8 is the same as that in FIG. 5. In the displayable area, the projection condition is re-set by the projection condition controlling section 23 with respect to image data having the color light amount distribution 103 of a displayed image which is not yet subjected to a projection condition control, as shown in FIG. 8. At this time, if the maximum levels of the image data items on the primary color images X and Y are 128 and 32, respectively, the amounts of light components of displayed images are $x_1$ and $y_1$, respectively. The amounts of the X and Y illumination light components are controlled such that they are maximized. In this example, actually, they are not increased, since the Y illumination light component is output such that its amount is already the maximum. In this state, the colors of the displayed images formed with the X and Y illumination light components which are controlled in amount are not balanced.

Next, the appropriate color balance vector $P_2$ calculated by the appropriate color balance vector calculating section 21 from the image data having the above color light amount distribution 103 not yet subjected to the projection condition control is input (step S23), the ratio between the data values of image data items Dr, Dg and Db is determined from the appropriate color balance vector (step S24). Thereafter, which of the data items Dr, Dg and Db is the largest in the above ratio is detected and specified (step S25), and the maximum value of the image data item specified as the largest one is converted and set to 255 (step S26). This is true of the case where each of the primary colors in each pixel is expressed by 8 bits. Needless to say, if each primary color in each pixel is expressed by another number of bits, the maximum value of the above specified image data item is not 255, i.e., it is determined in accordance with the number of bits. Furthermore, scale conversion is performed such that the other image data items are set based on the specified image data item to satisfy the above ratio determined from the appropriate color balance vector (step S27). Then, primary color image data items Dr', Dg' and Db' obtained by the above scale conversion are output to the display device modulation control driving sections 24R, 24G and 24B, and the display devices 12R, 12G and 12B are driven thereby, respectively (step S28). Further, the set emission control data items are output to the light source emission control driving sections 25R, 25G and 25B, and the LEDs 11R, 11G and 11B are made thereby to emit light components, respectively (step S29).

For example, in the example shown in FIG. 8, the scale conversion is carried out in a linear fashion such that the maximum gradation level of the image X is changed from 128 to 255, and the maximum light amount value of the displayed image X is increased to $X_2$. As a result, the light amount of the displayed image is increased to be four times greater than the original light amount $x_1$. Similarly, the scale conversion is performed in a linear fashion such that the maximum gradation level of the image Y is changed from 32 to 128. As a result, the light amount of the displayed image is increased to be four times greater than the original light amount $y_1$. Therefore, the increased light amounts $x_1$ and $Y_2$ can be obtained, the displayed images can be made more brightly, while maintaining the ratio of the original light amount $x_1$ to the original light amount $y_1$ ($x_1$:$y_1$). In this case, $x_1$:$y_1$ and $x_2$:$y_2$ are equivalent to the ratio between the components of the appropriate color balance vector $P_2$. In such a manner, a displayable range of the color distribution of the image data, in which an image can be displayed with a sufficiently necessary color distribution, is specified, and a projection condition (light amount and gradation data conversion) is adjustedly set such that an image can be more brightly displayed, while maintaining the specified displayable range of the color distribution.

For example, in the example shown in FIG. 8, with respect to the primary color image X, the amount of the illumination light component is controlled such that it is increased by Xmax/$X_0$ times, i.e., twice, and the value of the data item is doubled by the gradation data conversion, as shown in FIG. 9, as a result of which the upper limit of the light amount of the displayed image is increased by 2×2 times, i.e., four times. With respect to the primary color image Y, the amount of the illumination light component is controlled such that it is increased by Ymax/$y_0$ times, i.e., once, and the value of the data item is increased by four times, as a result of which the upper limit of the light amount of the displayed image is also increased by 1×4 times, i.e., four times.

That is, the projection condition controlling section 23 divides the maximum amounts of the light components which the LEDs 11R 11G and 11B serving as the light sources for the primary colors R, G and B can emit, by the initial values of the amounts of the light components emitted from these light sources (which are values at which white balance is achieved), thereby determining the ratio between the illumination light components of the primary colors R, G and B. Then, the values of input image data items for the primary colors R, G and B are data-converted by using a reciprocal ratio of the above ratio between the illumination light components, and the amounts of the light components of the primary colors from the light sources, which are set at the initial values, are set to the above maximum amounts of the light components of the primary colors. For example, suppose the maximum amounts of the light components of the primary colors R, G and B which the light sources for the primary colors R, G and B can emit are 1600, 1600 and 1600, and the initial values of the amounts of the light components which are emitted by the light sources for the primary colors R, G and B are 400, 200 and 800. In this case, the ratio between the amounts of the light components of the primary R, G and B colors is 4:8:2, and the reciprocal ratio of the ratio between the amounts of the light components is ¼:⅛:½=2:1:4. Therefore, the values of input image data items for the primary colors R, G and B are converted to be increased by 2n times, n times and 4n times, respectively, and the amounts of the light components from the light sources for the primary colors R, G and B are set at 1600, 1600 and 1600 (where n is adjusted such that it falls within a data value range in which an image can be displayed by the display device).

The Third Embodiment

Another example of the method for calculating the appropriate color balance vector with the appropriate color balance vector calculating section 21 will be explained as the third embodiment of the present invention. In the first embodiment explained with reference to FIG. 3, the displayable range of the image data is determined to set the values of $dx_1$ and $dy_1$ such that they cover the entire color distribution of the image data. However, as shown in FIG. 10, the values of $dx_1$ and $dy_1$ may be set such that they do not completely cover the color distribution of the image data. However, in this case, when the set emission amounts of the illumination light components of the colors exceed the maximum emission amounts of illumination light components which the light sources for the colors can emit, they need to be replaced by emission amounts which are close to the above set emission amounts, and are smaller than the above maximum emission amounts. To be more specific, when the values of primary colors of a pixel exceeds $dx_1$ and $dy_1$ as in, e.g., a pixel A, in FIG. 10, the pixel is replaced by a pixel located in an area (area C) in which those of pixels are smaller than $dx_1$ and $dy_1$. In this case, it is preferable that the above values of the pixel A be replaced by emission amounts smaller than the maximum emission amounts with respect to a straight line extending between connecting a starting point of the color space and each of the set emission amounts of the illumination light components of the colors. That is, referring to FIG. 10, the pixel A are replaced by a pixel A' whose values are the largest in the area (area C) in which those of the pixels are smaller than $dx_1$ and $dy_1$, on a line extending from the starting point to the pixel A, the color balance of the pixel is maintained.

Also, as not shown in figures, the pixel A may be replaced by a pixel A' having the Euclidean distance (intersymbol distance) of which is the shortest from the pixel A. The Euclidean distance is a distance defined in space according to a coordinate system of Dx-Dy. In this case, with respect to a pixel whose value and maximum value exceed $dx_1$ and $dy_1$, color reproduction cannot be accurately performed, and a color balance is lost. However, if the number of such pixels is small, i.e., some pixels which lose color balance are present in a projected image, they do not visually matter.

Furthermore, the replacement is not limited to the above manner. For example, it may be carried out according to a replacement table, which is prepared in advance based on checking whether replacement pixels by which pixels are replaced look unnatural or not.

Moreover, it is effective to prepare a neural network. To be more specific, a neural network is made to learn, and determine which of the pixels in the area C is used in place of a pixel in the area A.

According to the third embodiment provided in the above manner, with respect to the image data, a larger number of pixels can be made bright by projection of illumination light components.

The Fourth Embodiment

A further example of the method for calculating the appropriate color balance vector with the appropriate color balance vector calculating section 21 will be explained as the fourth embodiment of the present invention. In the fourth embodiment, a histogram of each of brightness values in the input image data is determined. Further, the maximum of brightness values is set by using the histogram, which are values at which the observer does not feel unnatural about the displayed image even if they are deleted as brightness values. In addition, area in which the input data is distributed is recognized by using the maximum brightness value of each of the illumination light components of the colors.

More specifically, first, an occurrence frequency distribution of color vectors of light components projected, which is obtained at coordinate axes Dx and Dy, is determined from color distribution of the image data, as shown in FIG. 11. Then, from occurrence frequency distribution with respect to the coordinate axis Dx, a set value $dx_1$ indicating a predetermined occurrence rate is determined at a value between the maximum and minimum values of the coordinate axis Dx. Similarly, from occurrence frequency distribution with respect to the coordinate axis Dy, a set value $dy_1$ indicating a predetermined occurrence rate is determined at a value between the maximum and minimum values of the coordinate axis Dy. From the values $dx_1$ and $dy_1$ determined in the above manner, an appropriate color balance vector $P_2$ is determined.

The values $dx_1$ and $dy_1$ are set such that even if pixels having coordinate values which exceed the values $dx_1$ and $dy_1$ are replaced by pixels in area in which the values of pixels are less than the values $dx_1$ and $dy_1$, they do not look unnatural. In order to find the degree to which the pixels do not look unnatural, a number of observers actually check displayed images corresponding to a number of sample image data, and determine the above degree based on their empirical rules.

The above replacement can be achieved by using the method explained with respect to the third embodiment.

The Fifth Embodiment

Figure 12:
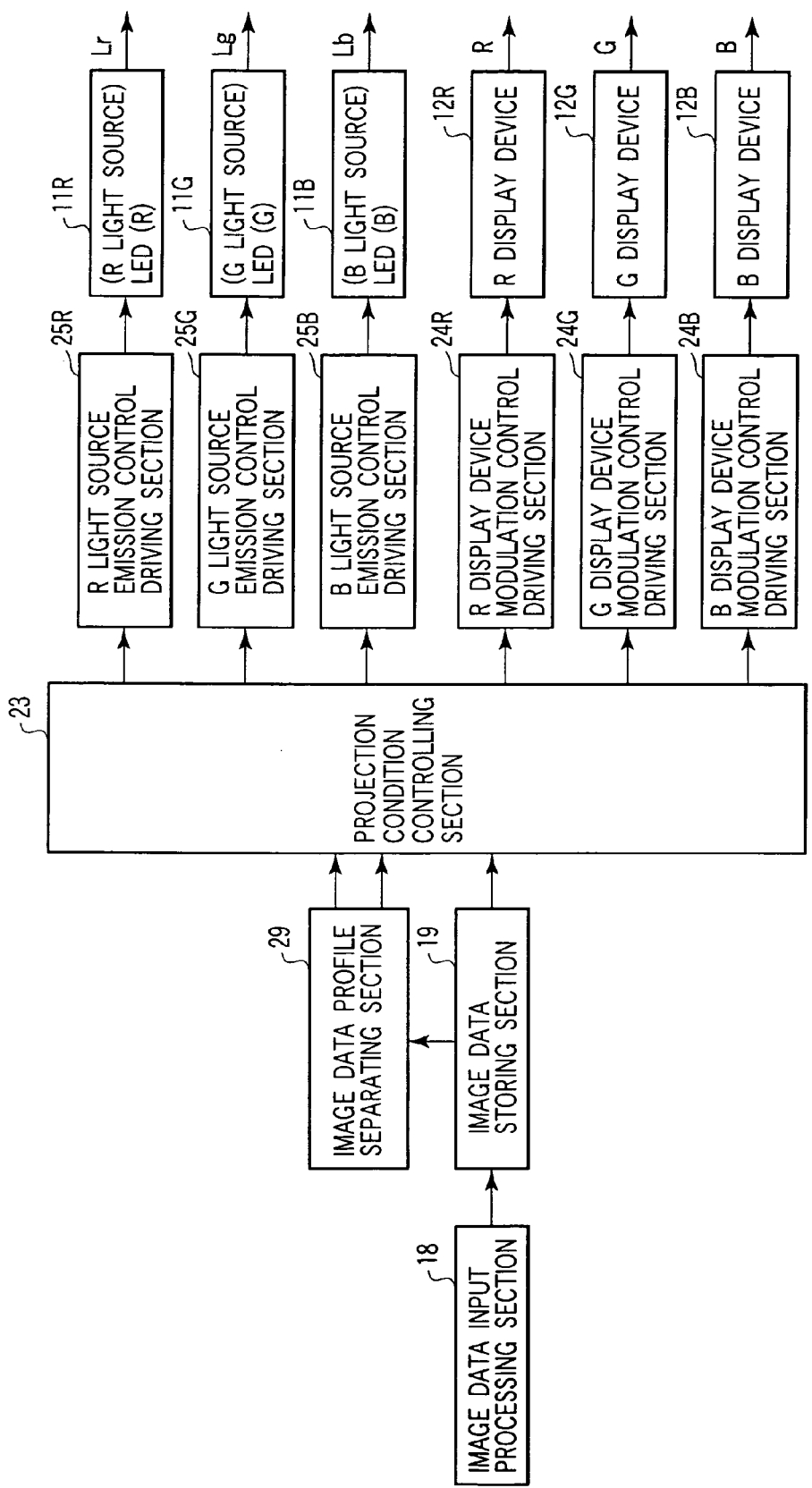
FIG. 12 is a view showing the structure of an image projecting apparatus according to the fifth embodiment of the present invention.

The image projecting apparatus according to the fifth embodiment of the present invention can be applied to the case where profile data is added as header information to the input image data. Specifically, the image projecting apparatus according to the fifth embodiment, as shown in FIG. 12, comprises an image data profile separating section 29 configured to separate an image data profile from the input image data stored in the image data storing section 19, instead of the calculating object image frame setting section 20, the appropriate color vector calculating section 21, the mode switching section 22, the color balance vector recording section 26, the image data kind setting and inputting section 27, and the color balance vector selecting section 28 in the first embodiment.

Figure 13:
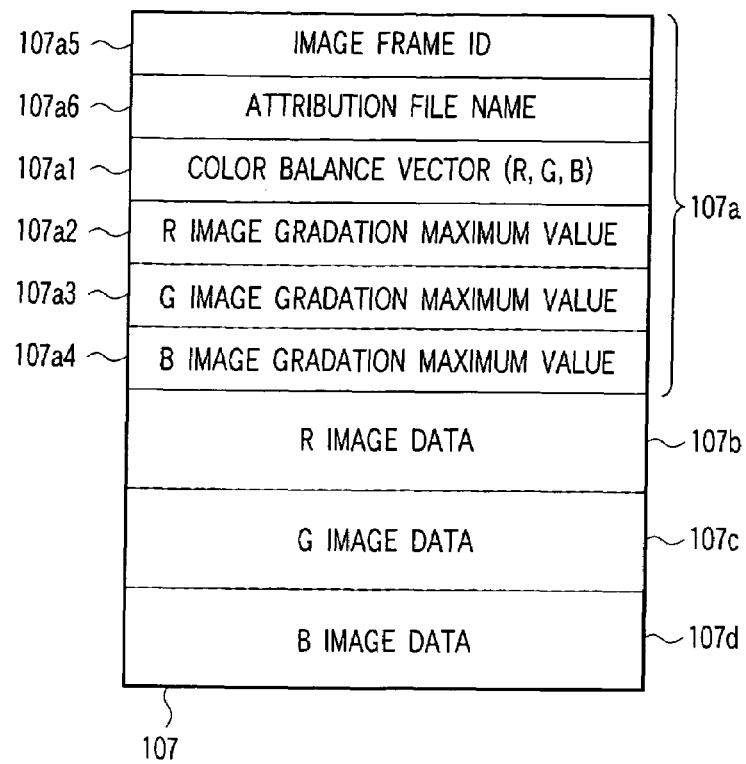
FIG. 13 is a view showing the format of an input image data.

The input image data which is input to the image data input processing section 18, and is stored in the image data storing section 19 has such a format as shown in FIG. 13. To be more specific, as the input image data, input image data 107 comprises an image data profile 107*a*, an R image data item 107*b*, a G image data item 107*c* and a B image data item 107*d*. The image data profile 107*a* includes at least information 107*a*1 regarding an color balance vector which is to be applied to the input image data 107 and maximum values 107*a*2, 107*a*3 and 107*a*4 of the primary image data items. Therefore, the image data profile separating section 29 can separate necessary information from the image data profile 107*a*, and send it to the projection condition controlling section 23. That is, the step can proceed a step of setting the projection condition, without need to calculating the color balance vector, unlike the first to fourth embodiments.

The above input image data is an example of an input image data which comprises image data items on respective frame images. However, in the image data, a predetermined group of image data items may be provided to share the same image data profile 107*a* with each other. In this case, data (image frame ID 107*a*5 and attribution file name 107*a*6) for specifying a frame to which the image data profile 107*a* is applied is added.

In such a manner, the input image data 107 includes the image data profile 107 wherein information regarding the area in which the input data is distributed in the color space is stored in advance, and the image data profile separating section 29 reads the information regarding the area from the image data profile 107*a*, thereby recognizing the area.

In this case, the image data is input in units of one image file, and the image data profile 107*a* stores information regarding an area in which the image data in the image file is distributed in units of one image file in the color space. Alternatively, the image data is input as moving image data, and the image data profile 107*a* stores information regarding an area in which the image data comprising image data items on respective scenes of a moving image corresponding to the moving image data is distributed in units of one series of frames in the color space. In this case, one series of frames corresponds to one series of scenes in the moving image corresponding to the moving image data.

The Sixth Embodiment

Figure 14:
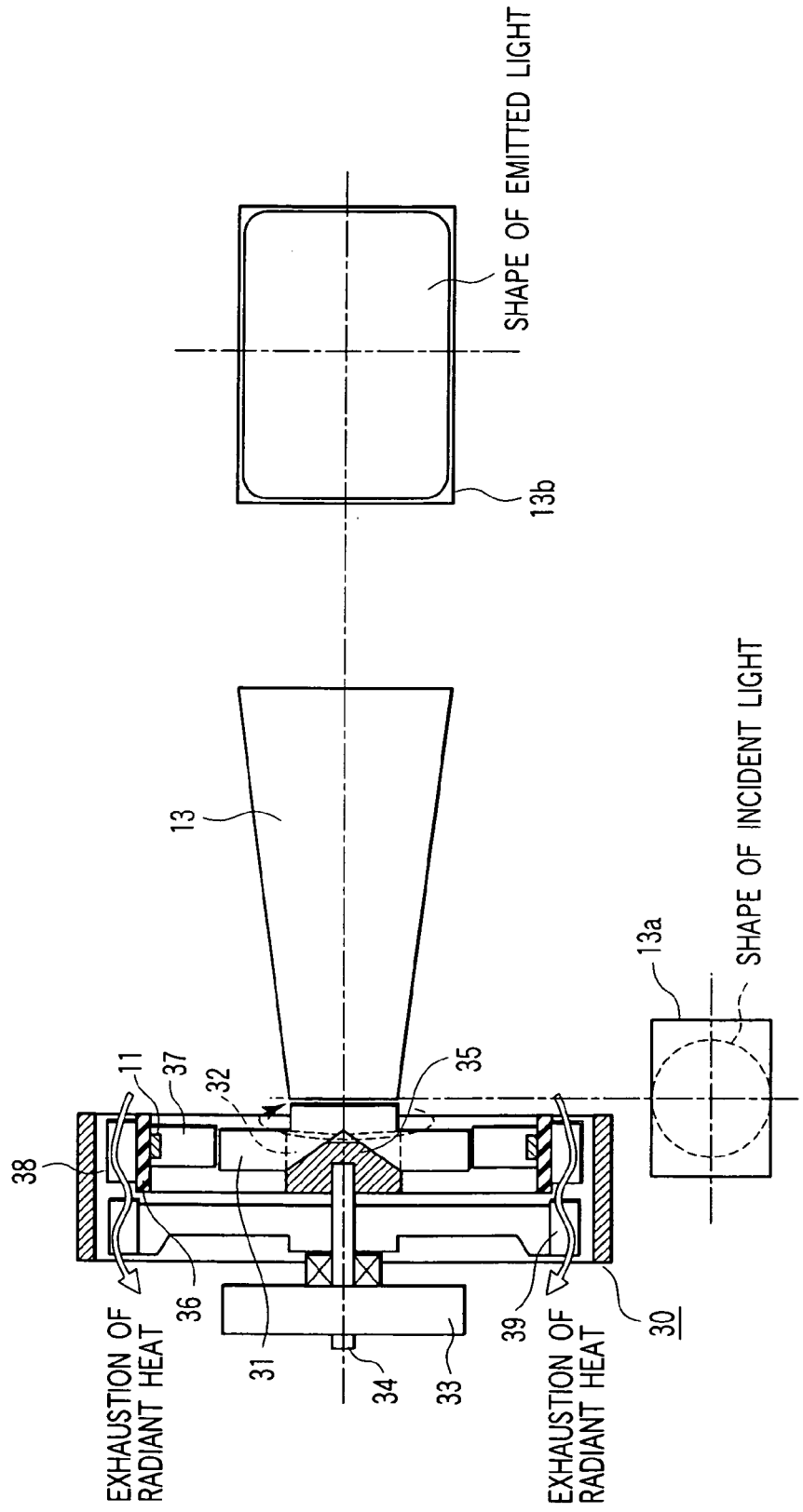
FIG. 14 is a view showing the structure of a light engine for use in an image projecting apparatus according to the sixth embodiment of the present invention.
Figure 15:
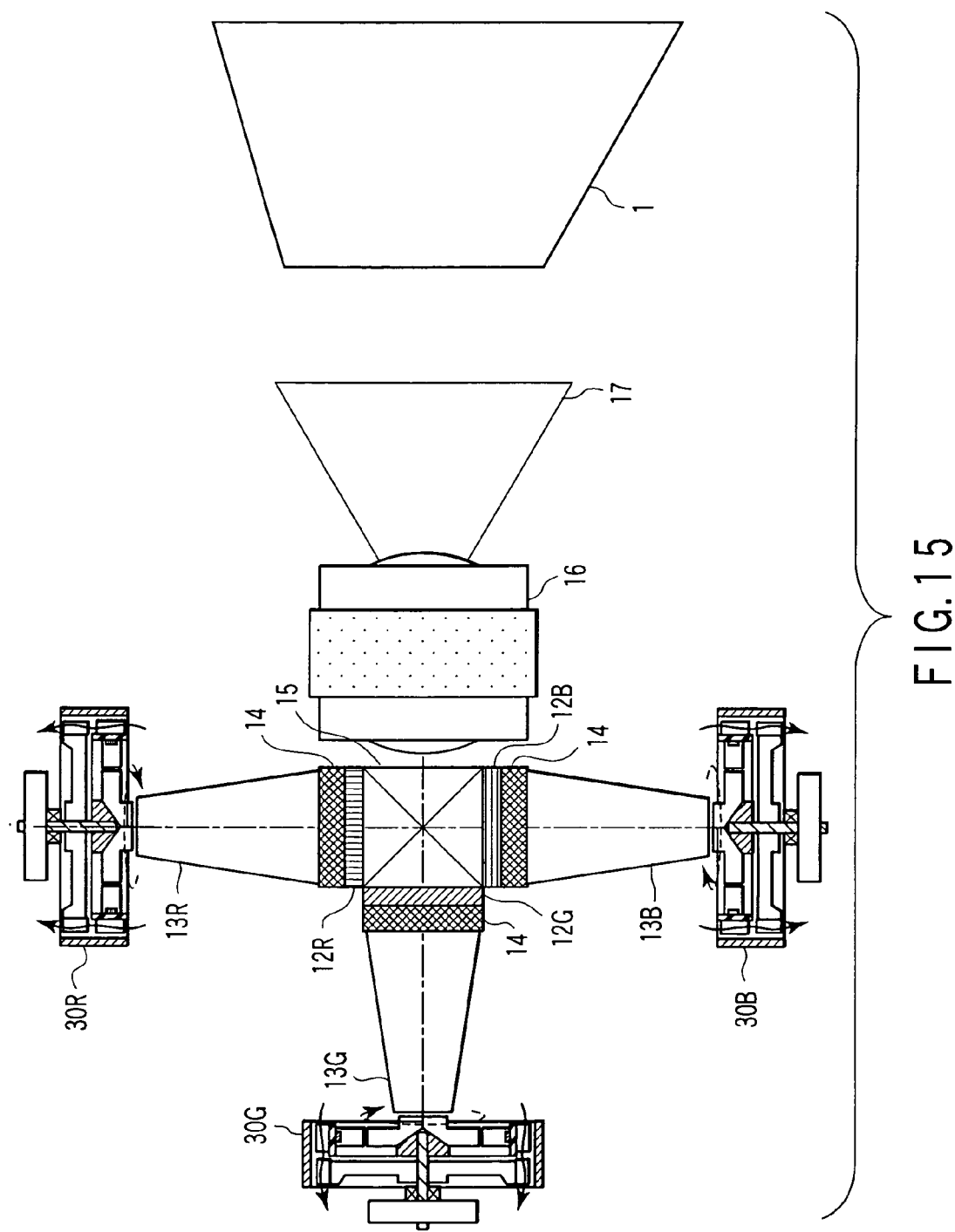
FIG. 15 is a view showing the structure of the image projecting apparatus according to the sixth embodiment of the present invention.

FIG. 14 is a view showing the structures of light engines for use in the image projecting apparatus according to the sixth embodiment of the present invention. FIG. 15 is a view showing the structure of the image projecting apparatus according to the sixth embodiment, to which a three plate method using the light engines is applied.

Specifically, the image projecting apparatus according to the sixth embodiment use light engines 30R, 30G and 30B, instead of the LEDs 11R, 11G and 11B serving as the light sources in the structure shown in FIG. 1. Each of the light engines 30R, 30G and 30B (which will be referred to as light engines 30) includes a light guiding member comprising a parallel rod 31 and a reflecting prism 32 which are formed of a single body. The light guiding member is held a rod holder 35 coupled with a rotational shaft 34 of a rotating motor 33, and is rotated at a high speed in a direction indicated by an arrow in FIG. 14. Then, a plurality of LEDs 11 serving as light sources, which are arranged on an inner peripheral surface of a drum-shaped emission board 36, are successively lit in accordance with rotation of the light guiding member. In this case, parallel rods 37 are fixedly provided for incidence surfaces which are end faces of the parallel rods 31, as light guiding portions for guiding diffused light from the LEDs 11, respectively. In the light engine having the above structure, the LED 11 associated with the position of one of the parallel rods 31 which is changed in accordance with the above rotation is lit, and diffused light from the lit LED 11 is guided by the parallel rod 37 provided therefore. Then, light from an emission surface of the parallel rod 37 is incident on the incidence surface of the parallel rod 31 which is located opposite to the parallel rod 37, is then reflected by the reflecting prism 32, and is then emitted from an emission surface of a taper rod 13.

Furthermore, radiation plates 38 are provided at an outer peripheral surface of the drum-shaped emission board 36, and radiate heat generated due to emission of light from the LEDs 11, thus preventing variation of the characteristics of the LEDs 11. Thus, even if each of the light engines 30 is continuously operated, light can be emitted stably. Furthermore, each light engine 30 comprises a radiation fan 39 for exhausting air contacting the radiation plate 38. The radiation fan 39 is coupled with the shaft of the rotating motor 33 for rotating the light guiding member, i.e., the rod holder 35. Therefore, the radiation fan 39 is rotated at the same time as the light guiding member is rotated by the rotating motor 33, as a result of which air contacting the radiation plate 38 can be exhausted. In such a manner, the rotating motor 33 for rotating the light guiding member doubles as the motor for the radiation fan 39 for radiating heat of the LED 11. Thus, two functions can be achieved by a single driving source. Accordingly, since the driving source is effectively used, the space to be used can be reduced, and power can be more effectively used.

The light engines 30 make the LEDs 11 successively emit pulse light components, and the relative positional relationships between the LEDs and the light guiding members for guiding the light components are selectively changed in accordance with switching of emission of the LEDs 11. As a result, the LEDs 11 can emit light having high brightness, and a large amount of light having an improved parallelism can be output from the emission ends of the light guiding members.

Furthermore, the parallel rods 37 for guiding diffused light components from the LEDs 11 to the light guiding members are provided for the LEDs 11, respectively. Thus, even if the LEDs 11 cannot be provided at a small pitch, the light components can be guided by the parallel rods 37 such that they travel as if they were emitted from the LEDs 11 which were arranged at a small pitch. By virtue of the above feature, the pitch of arrangement of the LEDs can be ensured, and the light engine can be more easily designed. In addition, in the case where the LEDs 11 are arranged at a small pitch, the light guiding members reliably take in the light components, i.e., the amounts of the light components taken in by the light guiding member are not decreased, emission of the light components can be reliably achieved.

Therefore, in the case where the LEDs 11 provided in the light engines 30 are designed to emit respective light components having different colors, i.e., R, G and B, they serve as an R light engine 30R, a G light engine 30G and a B light engine 30B, respectively, as shown in FIG. 15. Each display device in the image projecting apparatus as shown in FIG. 15 is an example of a display device using a transmission type liquid crystal. In the image projecting apparatus, it suffices that the amounts of the light components emitted from the LEDs 11 at the light engines 30 is controlled in the same manner as in the first to sixth embodiment.

The light emitted from each reflecting prism 32 is incident onto an incidence opening 13a of the taper rod 13 provided to be held by a holding mechanism not shown which is not rotatable, as to have such a circular incident light shape as indicated by a broken line in FIG. 14. The incidence opening 13a of the taper rod 13 is rectangularly shaped to satisfy the condition that the incident light shape is substantially inscribed in the incidence opening 13a. The light incident onto the taper rod 13 is emitted from an emission opening 13b of the taper rod 13 as illumination light having such a substantially rectangular cross section as shown in FIG. 14. In such a manner, illumination light having a rectangular shape can be obtained. Thus, when the illumination light is incident onto the display devices 12R, 12G and 12B each having a rectangular receiving surface, it can be efficiently utilized, since its cross section is coincident with the receiving surface of each of the display devices 12R, 12G and 12B.

The Seventh Embodiment

The seventh embodiment of the present invention is an example of a single plate type of image projecting apparatus which uses a refection type of display element called "DMD" (trademark). The DMD is a two-dimensional micro mirror deflection allay. It is disclosed in detail in, e.g., Jpn. Pat. Appln. KOKAI Publication No. 11-32278 and U.S. Pat. No. 6,129,437, and their explanation will be omitted.

Figure 16:
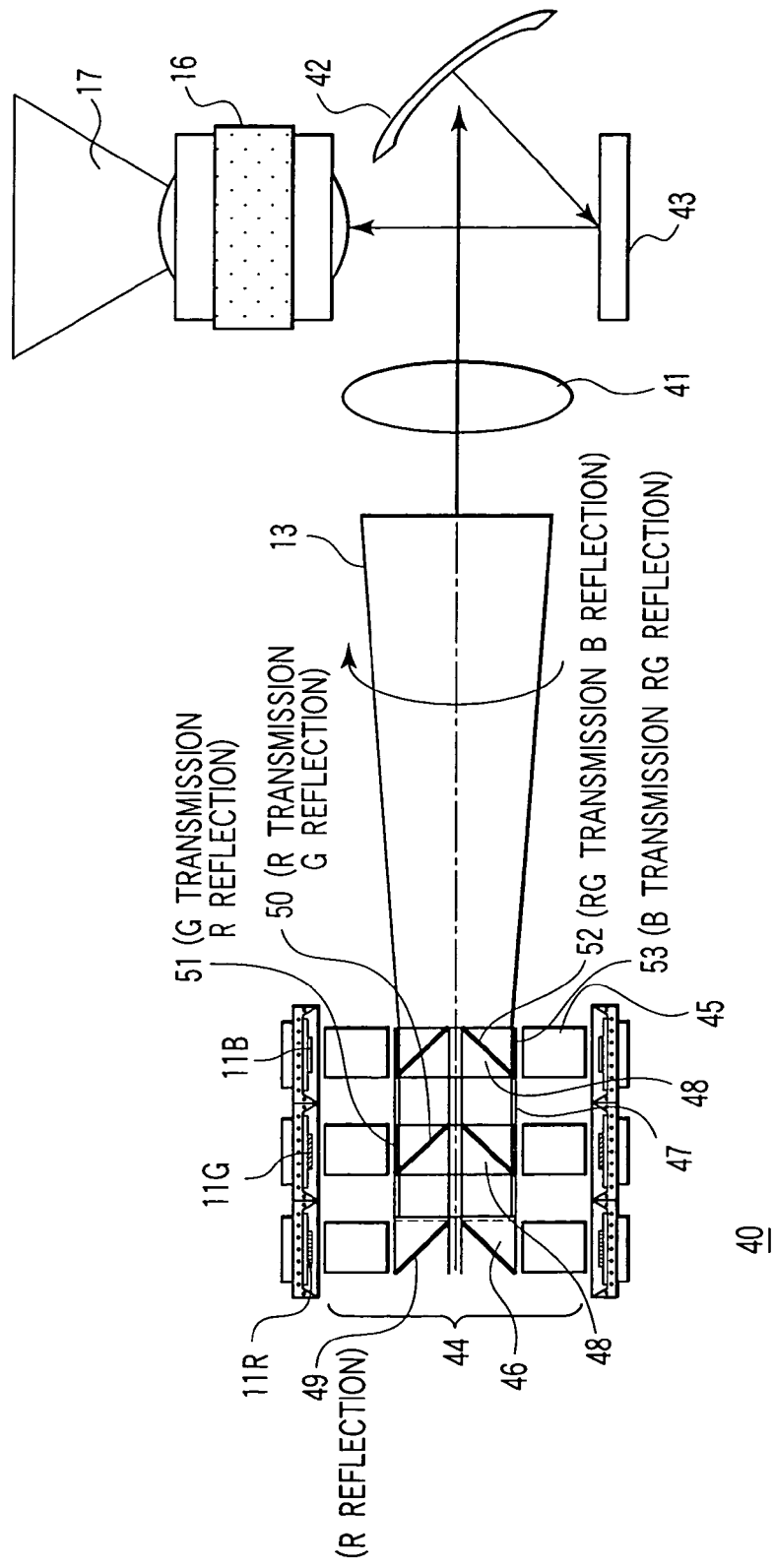
FIG. 16 is a view showing the structure of an image projecting apparatus according to the seventh embodiment of the present invention.

The image projecting apparatus according to the seventh embodiment, as shown in FIG. 16, uses a light engine which can combine light components of primary colors R, G and B into light, and emit the light. The light emitted from the light engine 40 is reflected by a reflecting mirror 42 through an illumination optical system 41, and is incident onto a DMD 43, and then modulated thereby. The light is then output as projection light 17 through a projection lens 16. In this case, the reflecting mirror 42 is designed to have a curvature such that light emitted from the light engine 40 and light incident onto a light receiving surface of the DMD 43 have a relationship with each other to achieve image formation, thereby obtaining a critical illumination system. The light receiving surface of the DMD 43 is rectangular, and the cross section of light output from the DMD 43 is determined in accordance with the aspect ratio of the light receiving surface of the DMD 43. This structure can be made compact to be provided in a housing not shown, since the path of illumination light is provided to be turn as shown in FIG. 16. Also, it should be noted that the structure is designed to provide a light path such that a so-called off light obtained when light is not incident from the DMD 43 onto the projection lens 16 due to a modulation operation of the DMD 43.

In the seventh embodiment, the light engine 40 has the following structure:

LEDs 11R, 11G and 11B are provided on respective outer peripheries of drum-shaped boards provided at three stages. To be more specific, the LEDs 11R, 11G and 11B provided at the stages emit light components of colors R, G and B, respectively. Further, single-unit movable section 44 is provided inward of the drum-shaped boards, and comprises six parallel rods 45, two triangular prisms 46, four light guiding pipes 47, four dichroic prisms 48 and one taper rod 13.

Referring to FIG. 16, at the leftmost one of the stages, the LEDs 11R each for emitting a red (R) light component are provided, and at diagonal surfaces of the associated triangular prisms 46, mirror coats 49 for reflecting light having a red (R) wavelength band are provided as described with a parenthesized expression in FIG. 16. No element is provided at the sides of the triangular prisms 46 which are closer to the LED 11R, i.e., incidence surfaces of the triangular prisms 46 which are located close to the parallel rods 45. Furthermore, at the center stage, the LEDs 11G each for emitting a green (G) light component are provided, and at the diagonal surfaces of the associated dichroic prisms 48, dichroic coats 50 which permit light having a red (R) wavelength band to be transmitted therethrough, and reflect light having a green (G) wavelength band are provided. In addition, dichroic coats 51 which permit light having a green (G) wavelength band to be transmitted therethrough, and reflects light having a red (R) wavelength band are provided on the sides of the dichroic prisms 48 which are closer to the LED 11G, i.e., incidence surfaces of the dichroic prisms 48 which are located close to the parallel rods 45. At the rightmost stage, the LEDs 11B each for emitting a blue (B) light component are provided, and at the diagonal surfaces of the associated dichroic prisms 48, dichroic coats 52 which permit light having red (R) and green (G) wavelength bands to be transmitted therethrough, and reflect light having a blue (B) wavelength band. In addition, dichroic coats 53 which permit light having a blue (B) wavelength band to be transmitted therethrough, and reflects light having red (R) and green (G) wavelength bands are provided on the sides of the dichroic prisms 48 which are closer to the LED 11B than the other sides, i.e., incidence sides of the dichroic prisms 48 which are located close to the parallel rods 45. It should be noted that the triangular prisms 46 may be replaced by dichroic prisms.

In the light engine 40 having the above structure, the single-unit movable section 44 attached to a rotatable holding member not shown is rotated by a rotating motor not shown in a direction indicated by an arrow in FIG. 16. Furthermore, the LEDS 11R, 11G and 11B serving as a plurality of light sources which are arranged on the outer peripheries of the drum-shaped boards are successively lit in accordance with the rotation of the single-unit movable section 44. That is, the LEDs 11R, 11G and 11B are successively lit to perform pulse emission, and their relative positional relationships with incidence ends of the single-unit movable section 44 are selectively changed in accordance with switching in pulse emission between the LEDs 11R, 11G and 11B. Consequently, the LEDs 11R, 11G and 11B can emit respective light components of the colors R, G and B which have effective high brightness, and large amounts of light components of the colors R, G and B which have improved parallelism can be obtained from emission end of the taper rod 13 which serves as emission end of the single-unit movable section 44.

Figure 17:
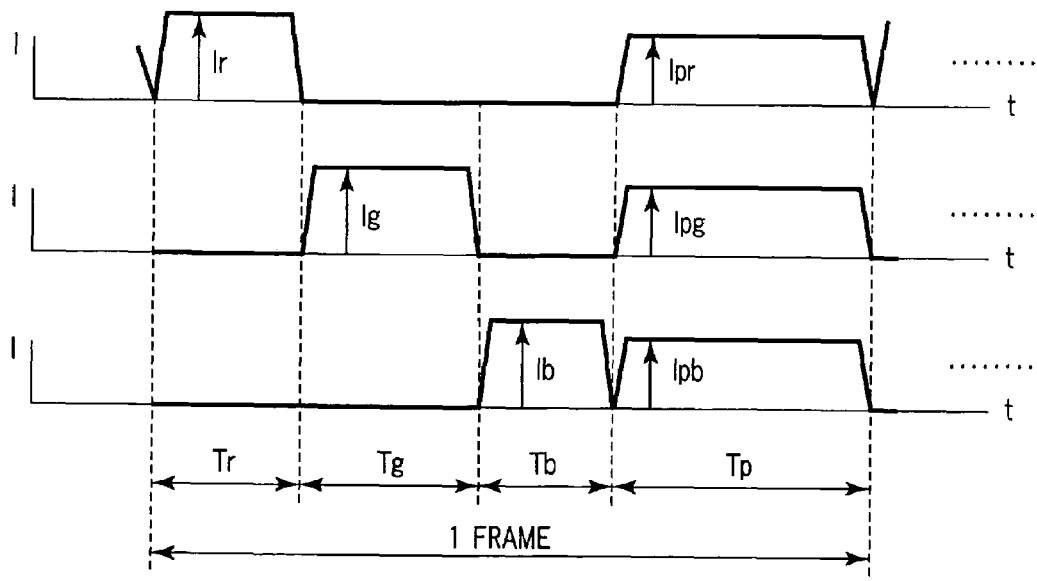
FIG. 17 is a view showing output sequences of illumination light.

In general, in a single plate type image projecting apparatus, LEDs for R, G and B are lit such that their R, G and B light components do not overlap each other in time division. In addition to such a sequence of lighting of the LEDs, the image projecting apparatus according to the seventh embodiment controls the amounts and times of emission of the R, G and B light components by using four sequences including a sequence of emitting all the R, G and B light components as shown in FIG. 17, thereby obtaining a desired amount of light.

That is, the amounts of the R, G and B light components are calculated by the method explained with respect to the first to fifth embodiments, and the R, G and B light components are controlled in emission amount such that the result of the above calculation satisfies the following:

the emission amount of the R light component:

$LR=(Ir \times Tr)+(Ipr \times Tp)$ the emission amount of the G light component:

$LG=(Ig \times Tg)+(Ipg \times Tp)$ the emission amount of the B light component:

$LB=(Ib \times Tb)+(Ipb \times Tp)$

In this case, the component ratio between LR, LG and LB is made coincident with that in appropriate color balance vector.

The Eighth Embodiment

The first to seventh embodiments are explained by referring to the case where the image projecting apparatus is applied to a so-called projector for projecting an image on the screen 1. However, the image projecting apparatus can be applied to various kinds of apparatuses other than the projector.

Figure 18:
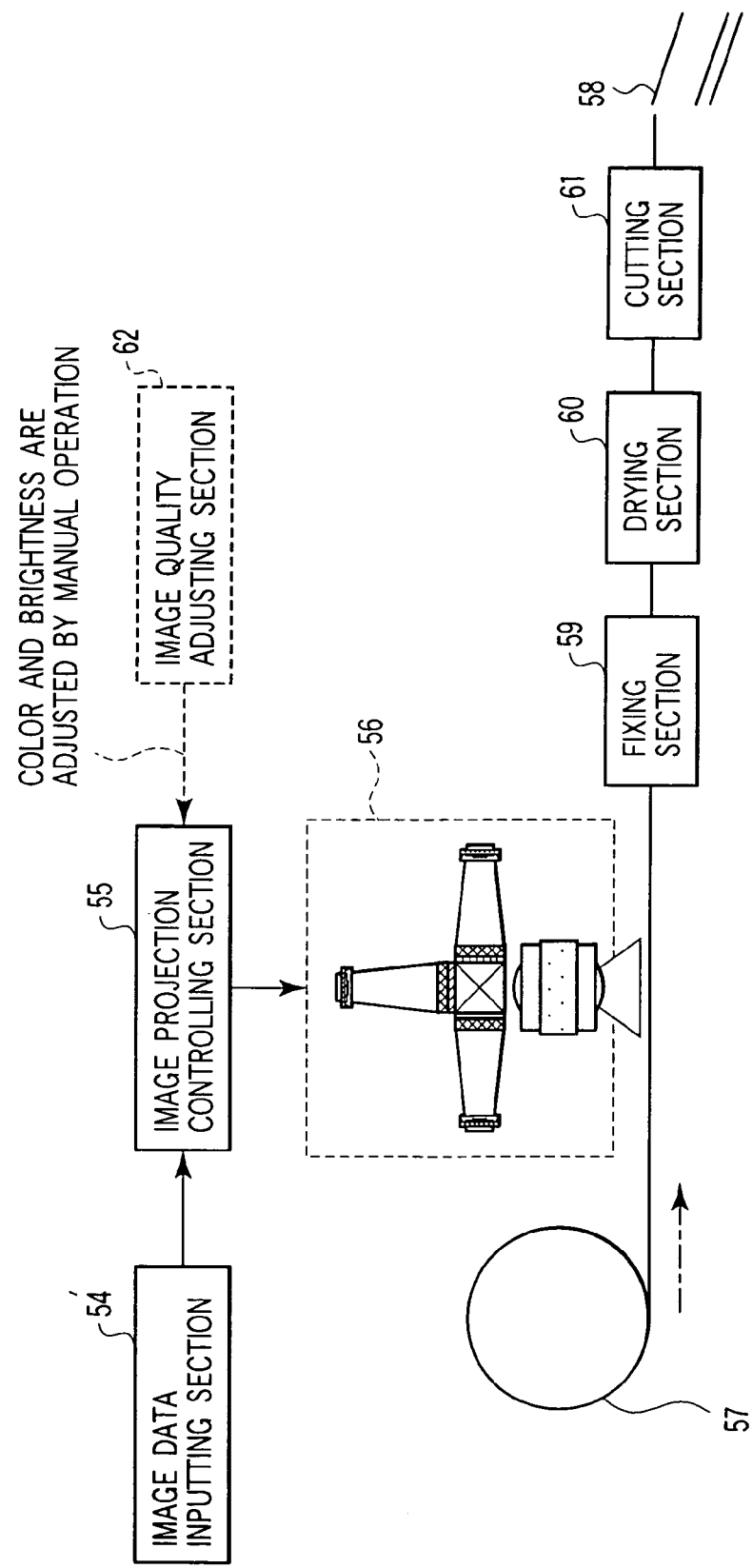
FIG. 18 is a view showing the structure of a photographic exposure apparatus to which the image forming apparatus is applied, according to the eighth embodiment of the present invention.

For example, as shown in FIG. 18, the image projecting apparatus can be applied to a photographic exposure apparatus. After being subjected to input processing, image data input by an image inputting section 54 is input to an image projection controlling section 55. The image projecting controlling section 55 controls an image projecting section 56 which comprises such an image projecting apparatus as explained with respect to the first to seventh embodiment, such as that according to the first embodiment, to project an image. The projected image is exposure-printed on a predetermined photographic paper sheet 58 fed from a photographic paper sheet roll 57. The time period for exposure is optimally adjusted in accordance with the brightness of the projected image. According to the eight embodiment, a larger amount of light is ensured that in a conventional CRT printer type or LED array type of image projecting apparatus, and processing is carried out at a higher speed, since recording is carried out in a surface-recording manner. After passing through a fixing section 58 and a drying section 60, the exposed photographic paper sheet 58 is cut by a cutting section 61 to have a predetermined size, and is fed to the outside.

In order to control an exposure state, data or a signal for use in desirably adjusting the color and brightness is output from an image quality adjusting section 62 to the image projection controlling section 55 as shown in FIG. 18. The color can be easily adjusted by controlling the illumination light components of the primary colors or the display devices, as explained with respect to the above embodiments. The same is true of the brightness. In the example shown in FIG. 18, adjustment of the color and brightness is manually performed. Needless to say, a structure using a sensor, etc., which automatically adjusts the color and brightness to obtain a desired color and brightness, can be provided.

Moreover, if a rewritable electron paper on which optical writing can be performed and rewriting can be easily performed is used instead of the photographic paper sheet 58, the present invention can be applied as effective image forming means to a rewritable electron paper recording apparatus which would be put to practical use in future.

Similarly, if a next-generation copying machine or printer which can perform surface recording instead of conventional linear recording is developed, the present invention can be applied as effective image forming means.

As described above, the present invention is explained by referring to the above embodiments; however, it is not limited to the embodiments. Needless to say, various modifications and applications can be without departing from the subject matter of the present invention. For example, the appropriate color balance vector calculating section 21 may be formed to determine the maximum values of data items on respective colors, which are included in the input image data, and recognize the area in which the image data is distributed, by using the above maximum values.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An image display apparatus for displaying a display image in accordance with input image data of a plurality of colors, to enable an observer to observe the image, comprising:
   a light source section which is configured to emit illumination light of said each color;
   a display device which is illuminated by said illumination light and is configured to enable the observer to observe said display image by forming an image in accordance with said input image data of each color to modulate a light amount of said illumination light;
   a distribution area recognizing section which is configured to specify and recognize an area in which each pixel structuring said image data of each color is distributed in a color space defined by said image data of each color; and
   a projection condition controlling section which is configured to control a magnification of data conversion of image data used in modulation by said display device and a magnification of light amount control of illumination light emitted from said light source section to make a multiplied value of the magnification of data conversion and the magnification of light amount control equal in each color so that a color distribution of said display image observed by the observer has an appropriate color balance vector having the same direction and a large size as those of an appropriate color balance vector showing a color distribution of an area recognized in said distribution area recognizing section.

2. The image display apparatus according to claim 1, wherein:
   the illumination light component of each of colors is emitted on the display device, with image corresponding to color image data item associated with the color formed by the display device; and
   the projection condition controlling section includes (i) an illumination light amount setting section configured to divide a predetermined upper limit value of image data obtained by the display device by a value of the input image data, thereby determining a data ratio between the colors, and to set amounts of the illumination light components from the light source section by using a reciprocal ratio of the data ratio, and (ii) an image data converting section configured to change the value of the input image data to the predetermined upper limit value.

3. The image display apparatus according to claim 2, wherein the predetermined upper limit value of the image data obtained by the display device corresponds to a data value of a maximum gradation of an image which is allowed to be formed by the display device.

4. The image display apparatus according to claim 2, wherein
   when the set emission amounts of the illumination light components exceed respective maximum emission amounts of illumination light components of colors allowed to be emitted from the light source section for the colors, the illumination light amount setting section replaces the set emission amounts of the illumination light components by emission amounts which are close to the set emission amounts, and are less than the respective maximum emission amounts.

5. The image display apparatus according to claim 4, wherein
   the emission amounts which are close to the set emission amounts, and are smaller than the respective maximum emission amounts correspond to emission amounts smaller than maximum emission amounts wherein Euclidean distances are the shortest from the set emission amounts of the illumination light components in the color space.

6. The image display apparatus according to claim 4, wherein
   the emission amounts which are close to the set emission amounts, and are smaller than the respective maximum emission amounts correspond to emission amounts smaller than maximum emission amounts in a straight line connecting the set emission amounts of the illumination light components of colors and a color space starting point in the color space.

7. The image display apparatus according to claim 2, wherein
   the light source section comprises a plurality of LEDs for emitting light components of different colors.

8. The image display apparatus according to claim 2, wherein
   as the display device, the image display apparatus comprises a plurality of display devices for respective colors used in the image projected onto the projection surface,
   the plurality of display devices form respective images at the same time in accordance with respective color information items of the input image data, and
   illumination light components of colors are respectively emitted from the light source section on the display devices at the same time.

9. The image display apparatus according to claim 2, wherein
   the display device comprises only one display device, and
   the plurality of illumination light components of colors are successively emitted from the light source section onto the display device to respective images of the colors.

10. The image display apparatus according to claim 2, wherein
    the illumination light amount setting section is configured to set at least one of a value of current and that of a voltage to be applied to the light source section.

11. The image display apparatus according to claim 2, wherein
    the illumination light amount setting section is configured to set one of a value of current, that of a voltage to be applied to the light source section and a time period of emission of the light source section.

12. The image display apparatus according to claim 1, wherein
    the illumination light component of each of colors is emitted on the display device, with image corresponding to color image data item associated with the color formed by the display device, and the projection condition controlling section includes (i) an image data converting section configured to divide predetermined upper limit values of emission amounts of illumination light components which are allowed to be by the light source section, by initial values of the emission amounts of the light components emitted by the light source section, thereby determining a ratio between emission amounts of the illumination light components of colors, and convert a value of the input image data by using a reciprocal ratio of the ratio between the emission amounts, and (ii) an illumination light amount setting section configured to set the emission amounts of the light components of the colors which are set at the initial values to the predetermined upper limit values of the emission amounts.

13. The image display apparatus according to claim 12, wherein
the predetermined upper limit values of the emission amounts of the illumination light components correspond to values of maximum emission amounts of illumination light components which are allowed to be emitted by the display device.

14. The image display apparatus according to claim 12, wherein
the light source section comprises a plurality of LEDs for emitting light components of different colors.

15. The image display apparatus according to claim 12, wherein
as the display device, the image display apparatus comprises a plurality of display devices for respective colors used in the image projected onto the projection surface,
the plurality of display devices form respective images at the same time in accordance with respective color information items of the input image data, and
illumination light components of colors are respectively emitted from the light source section on the display devices at the same time.

16. The image display apparatus according to claim 12, wherein
the display device comprises only one display device, and
the plurality of illumination light components of colors are successively emitted from the light source section onto the display device to respective images of the colors.

17. The image display apparatus according to claim 12, wherein
the illumination light amount setting section is configured to set at least one of a value of current and that of a voltage to be applied to the light source section.

18. The image display apparatus according to claim 12, wherein
the illumination light amount setting section is configured to set one of a value of current, that of a voltage to be applied to the light source section and a time period of emission of the light source section.

19. The image display apparatus according to claim 1, wherein
said appropriate color balance vector used by the projection condition controlling section is an arbitrary vector in which a degree of dispersion is maximum when color vectors of the image data are projected onto the arbitrary vector in the color space.

20. The image display apparatus according to claim 1, wherein
the distribution area recognizing section is configured to determine maximum values of image data items regarding colors which are included in the input data, and recognize the area in which the image data is distributed, by using the maximum values of the image data items regarding the colors.

21. The image display apparatus according to claim 1, wherein
the distribution area recognizing section is configured to determine a histogram of each of brightness values in the input image data, set a maximum brightness value of each of the illumination light components of the colors by using the histogram, and recognize the area in which the image data is distributed by using the maximum brightness value of the each of the illumination light components of the colors.

22. The image display apparatus according to claim 1, wherein
the image data is input to the image display apparatus in units of one image file,
the distribution area recognizing section is configured to recognize the area in which each, pixel structuring the image data is distributed in the color space, in units of one image file, and
the projection condition controlling section is configured to control the magnification of light of the illumination light emitted from the light source section, in units of one image file of the input image data.

23. The image display apparatus according to claim 22, wherein
the distribution area recognizing section is configured to recognize the area by using distribution of image data items of a plurality of frames in image file of the input image data, in the color space.

24. The image display apparatus according to claim 1, wherein
the image data is input as moving image data to the image display apparatus,
the distribution area recognizing section is configured to recognize the area in which each pixel structuring the image data is distributed in the color space, in units of one series of frames in the input moving image data, and
the projection condition controlling section is configured to control the magnification of light of the illumination light emitted from the light source section, in units of one series of frames in the input moving image data.

25. The image display apparatus according to claim 24, wherein
one series of frames in the input moving image data corresponds to each of a series of scenes of a moving image corresponding to the input moving image data.

26. The image display apparatus according to claim 25, wherein
the moving image data input to the image display apparatus is data subjected to data compressing processing performed between frames which are successive on a time series basis, and
the distribution area recognizing section and the projection condition controlling section are configured to recognize switching of scenes from variation of a data amount in each of frames in the moving image data.

27. The image display apparatus according to claim 24, wherein
the distribution area recognizing section is configured to recognize the area by using distribution of image data items of a plurality of frames included in a series of frames of the input image data, in the color space.

28. The image display apparatus according to claim 1, further comprising a distribution area storing section configured to store in advance information regarding the area in which the input image is distributed in the color space, and wherein
the distribution area recognizing section is configured to recognize the area by reading the information stored in the distribution area storing section.

29. The image display apparatus according to claim 28, wherein
the image data is input to the image display apparatus in units of one image file, and
the distribution area storing section is configured to store information regarding an area in which the input image data is distributed in the color space in units of one image file in the color space.

30. The image display apparatus according to claim 28, wherein
the image data is input as moving image data to the image display apparatus, and
in the area, the image data is distributed the distribution area storing section is configured to store an area in which the image data is distributed in the color space in units of one series of frames in the moving image data.

31. The image display apparatus according to claim 28, wherein
one series of frames in the moving image data corresponds to a series of scenes of a moving image corresponding to the input moving image data.

32. The image display apparatus according to claim 28, wherein
the image display apparatus is configured to project an image in accordance with each of a plurality of display modes,
the image display apparatus further comprises a display mode selecting section configured to enable the observer to select one of the plurality of display modes,
the distribution area storing section is configured to store a plurality of information items regarding the area, which are associated with the plurality of display modes, respectively, and
the distribution area recognizing section is configured to read the information item associated with the one of the plurality of display modes from the distribution area storing section, and recognize the area indicated in the read information item as the area in which the input image data is distributed in the color space.

33. An image display apparatus for displaying a display image in accordance with input image data of a plurality of colors, to enable an observer to observe the image, comprising:
light source means for emitting illumination light of said each color;
display means illuminated by said illumination light for enabling the observer to observe said display image by forming an image in accordance with said input image data of each color to modulate a light amount of said illumination light;
distribution area recognizing means for specifying and recognizing an area in which each pixel structuring said image data of each color is distributed in a color space defined by said image data of each color; and
projection condition controlling means for controlling a magnification of data conversion of image data used in modulation by said display means and a magnification of light amount control of illumination light emitted from said light source means to make a multiplied value of the magnification of data conversion and the magnification of light amount control equal in each color so that a color distribution of said display image observed by the observer has an appropriate color balance vector having the same direction and a large size as those of an appropriate color balance vector showing a color distribution of an area recognized in said distribution area recognizing means.

* * * * *